US007822680B1

(12) United States Patent
Weber et al.

(10) Patent No.: US 7,822,680 B1
(45) Date of Patent: Oct. 26, 2010

(54) SYSTEM AND METHOD FOR MANAGING DATA PERTAINING TO A PLURALITY OF FINANCIAL ASSETS FOR MULTIFAMILY AND HOUSING DEVELOPMENTS

(75) Inventors: Phillip J. Weber, Washington, DC (US); Edwin B. Neill, Baltimore, MD (US); Brian K. Hunt, Olney, MD (US)

(73) Assignee: Fannie Mae, Washington, DC (US)

( * ) Notice: Subject to any disclaimer, the term of this patent is extended or adjusted under 35 U.S.C. 154(b) by 1240 days.

(21) Appl. No.: 11/026,102

(22) Filed: Dec. 30, 2004

Related U.S. Application Data

(60) Provisional application No. 60/533,566, filed on Dec. 31, 2003.

(51) Int. Cl.
*G06Q 40/00* (2006.01)

(52) U.S. Cl. .............................. 705/38; 705/35; 705/36; 705/37

(58) Field of Classification Search .................... 705/35, 705/36, 37, 38
See application file for complete search history.

(56) References Cited

U.S. PATENT DOCUMENTS

| | | | |
|---|---|---|---|
| 3,316,395 | A | 4/1967 | Lavin |
| 4,876,648 | A | 10/1989 | Lloyd |
| 5,239,462 | A | 8/1993 | Jones et al. |
| 5,262,941 | A | 11/1993 | Saladin et al. |
| 5,274,547 | A | 12/1993 | Zoffel et al. |
| 5,323,315 | A | 6/1994 | Highbloom |
| 5,361,201 | A | 11/1994 | Jost et al. |
| 5,414,621 | A | 5/1995 | Hough |
| 5,537,315 | A | 7/1996 | Mitcham |
| 5,563,783 | A | 10/1996 | Stolfo et al. |

(Continued)

FOREIGN PATENT DOCUMENTS

JP          04182868          6/1992

(Continued)

OTHER PUBLICATIONS

Fannie Mae, "Guide to Underwriting with Desktop Underwriter®", Sep. 2002; 63 pgs.

(Continued)

*Primary Examiner*—Nga B. Nguyen
(74) *Attorney, Agent, or Firm*—Foley & Lardner LLP

(57) ABSTRACT

A data processing system for managing information related to a plurality of financial assets associated with housing and mortgage investments of an investor includes user interface logic configured to receive data regarding the plurality of financial assets including data regarding a plurality of properties associated with the plurality of financial assets. The user interface logic is further configured to provide access to the data regarding the plurality of financial assets. Data management logic is coupled to the user interface logic and is configured to retrieve and process the data regarding the plurality of financial assets. A database is coupled to the data management logic and the user interface logic and is configured to store the data regarding the plurality of financial assets and to link data for a particular property of the plurality of properties across the plurality of financial assets. The data regarding each property in the plurality of properties including any associated financial assets is maintained across multiple transactions and for different counterparties.

25 Claims, 34 Drawing Sheets

U.S. PATENT DOCUMENTS

| | | | |
|---|---|---|---|
| 5,611,052 A | 3/1997 | Dykstra et al. | |
| 5,615,268 A | 3/1997 | Bisbee et al. | |
| 5,689,649 A | 11/1997 | Altman et al. | |
| 5,696,907 A | 12/1997 | Tom | |
| 5,699,527 A | 12/1997 | Davidson | |
| 5,732,400 A | 3/1998 | Mandler et al. | |
| 5,765,144 A | 6/1998 | Larche et al. | |
| 5,797,133 A | 8/1998 | Jones et al. | |
| 5,870,721 A | 2/1999 | Norris | |
| 5,878,403 A | 3/1999 | DeFrancesco et al. | |
| 5,878,404 A | 3/1999 | Stout, Jr. et al. | |
| 5,930,775 A | 7/1999 | McCauley et al. | |
| 5,930,776 A | 7/1999 | Dykstra et al. | |
| 5,940,811 A | 8/1999 | Norris | |
| 5,940,812 A | 8/1999 | Tengel et al. | |
| 5,966,699 A | 10/1999 | Zandi | |
| 5,966,700 A | 10/1999 | Gould et al. | |
| 5,970,464 A | 10/1999 | Apte et al. | |
| 5,974,372 A | 10/1999 | Barnes et al. | |
| 5,983,206 A | 11/1999 | Oppenheimer | |
| 5,995,947 A | 11/1999 | Fraser et al. | |
| 6,014,645 A | 1/2000 | Cunningham | |
| 6,021,202 A | 2/2000 | Anderson et al. | |
| 6,029,149 A | 2/2000 | Dykstra et al. | |
| 6,035,288 A | 3/2000 | Solomon | |
| 6,044,362 A | 3/2000 | Neely | |
| 6,070,151 A | 5/2000 | Frankel | |
| 6,076,070 A | 6/2000 | Stack | |
| 6,088,686 A | 7/2000 | Walker et al. | |
| 6,105,007 A | 8/2000 | Norris | |
| 6,112,190 A | 8/2000 | Fletcher et al. | |
| 6,119,103 A | 9/2000 | Basch et al. | |
| 6,125,349 A | 9/2000 | Maher | |
| 6,144,948 A | 11/2000 | Walker et al. | |
| 6,202,053 B1 | 3/2001 | Christiansen et al. | |
| 6,226,624 B1 | 5/2001 | Watson et al. | |
| 6,233,566 B1 * | 5/2001 | Levine et al. | 705/36 R |
| 6,289,319 B1 | 9/2001 | Lockwood | |
| 6,311,169 B2 | 10/2001 | Duhon | |
| 6,324,526 B1 | 11/2001 | D'Agostino | |
| 6,367,013 B1 | 4/2002 | Bisbee et al. | |
| 6,385,594 B1 | 5/2002 | Lebda et al. | |
| 6,401,070 B1 | 6/2002 | McManus et al. | |
| 6,405,181 B2 | 6/2002 | Lent et al. | |
| 6,430,539 B1 | 8/2002 | Lazarus et al. | |
| 6,438,526 B1 | 8/2002 | Dykes et al. | |
| 6,505,176 B2 | 1/2003 | DeFrancesco, Jr. et al. | |
| 6,513,018 B1 | 1/2003 | Culhane | |
| 6,532,450 B1 | 3/2003 | Brown et al. | |
| 6,564,190 B1 | 5/2003 | Dubner | |
| 6,584,467 B1 | 6/2003 | Haught et al. | |
| 6,594,635 B1 | 7/2003 | Erlanger | |
| 6,609,109 B1 | 8/2003 | Bradley et al. | |
| 6,611,816 B2 | 8/2003 | Lebda et al. | |
| 6,651,884 B2 | 11/2003 | Predergast et al. | |
| 6,671,673 B1 | 12/2003 | Baseman et al. | |
| 6,823,319 B1 | 11/2004 | Lynch et al. | |
| 6,985,881 B2 * | 1/2006 | Johnson et al. | 705/36 R |
| 7,027,997 B1 | 4/2006 | Robinson et al. | |
| 7,146,337 B1 | 12/2006 | Ward et al. | |
| 7,319,971 B2 | 1/2008 | Abrahams et al. | |
| 7,346,573 B1 | 3/2008 | Cobrinik et al. | |
| 7,657,475 B1 | 2/2010 | Arpin et al. | |
| 2001/0029482 A1 | 10/2001 | Tealdi et al. | |
| 2001/0032178 A1 | 10/2001 | Adams et al. | |
| 2001/0037287 A1 | 11/2001 | Broadbent et al. | |
| 2002/0029154 A1 | 3/2002 | Majoor | |
| 2002/0029194 A1 | 3/2002 | Lewis et al. | |
| 2002/0032635 A1 | 3/2002 | Harris et al. | |
| 2002/0035520 A1 | 3/2002 | Weiss | |
| 2002/0038318 A1 | 3/2002 | Cochran et al. | |
| 2002/0040312 A1 | 4/2002 | Dhar et al. | |
| 2002/0040339 A1 | 4/2002 | Dhar et al. | |
| 2002/0052815 A1 | 5/2002 | Johnson et al. | |
| 2002/0052835 A1 | 5/2002 | Toscano | |
| 2002/0055905 A1 * | 5/2002 | Jannah et al. | 705/38 |
| 2002/0059137 A1 | 5/2002 | Freeman et al. | |
| 2002/0077968 A1 | 6/2002 | Kaniwa et al. | |
| 2002/0087364 A1 | 7/2002 | Lerner et al. | |
| 2002/0087389 A1 | 7/2002 | Sklarz et al. | |
| 2002/0091550 A1 | 7/2002 | White et al. | |
| 2002/0091630 A1 | 7/2002 | Inoue | |
| 2002/0099650 A1 | 7/2002 | Cole | |
| 2002/0111835 A1 | 8/2002 | Hele et al. | |
| 2002/0111901 A1 | 8/2002 | Whitney | |
| 2002/0138414 A1 | 9/2002 | Baker, IV | |
| 2002/0152155 A1 * | 10/2002 | Greenwood et al. | 705/38 |
| 2002/0152165 A1 | 10/2002 | Dutta et al. | |
| 2002/0152170 A1 | 10/2002 | Dutta et al. | |
| 2003/0023610 A1 | 1/2003 | Bove et al. | |
| 2003/0028478 A1 | 2/2003 | Kinney et al. | |
| 2003/0033241 A1 | 2/2003 | Harari | |
| 2003/0033242 A1 | 2/2003 | Lynch et al. | |
| 2003/0036994 A1 | 2/2003 | Witzig et al. | |
| 2003/0036995 A1 | 2/2003 | Lazerson | |
| 2003/0036996 A1 | 2/2003 | Lazerson | |
| 2003/0046223 A1 | 3/2003 | Crawford et al. | |
| 2003/0065614 A1 | 4/2003 | Sweeney | |
| 2003/0093366 A1 | 5/2003 | Halper et al. | |
| 2003/0110249 A1 | 6/2003 | Buus et al. | |
| 2003/0144949 A1 | 7/2003 | Blanch | |
| 2003/0163337 A1 | 8/2003 | Kasten | |
| 2003/0167191 A1 | 9/2003 | Slabonik et al. | |
| 2003/0172025 A1 | 9/2003 | Gallina | |
| 2003/0177032 A1 | 9/2003 | Bonissone et al. | |
| 2003/0182159 A1 | 9/2003 | Bonissone et al. | |
| 2003/0187696 A1 | 10/2003 | Bonissone et al. | |
| 2003/0187697 A1 | 10/2003 | Bonissone et al. | |
| 2003/0187698 A1 | 10/2003 | Bonissone et al. | |
| 2003/0187699 A1 | 10/2003 | Bonissone et al. | |
| 2003/0187700 A1 | 10/2003 | Bonissone et al. | |
| 2003/0187701 A1 | 10/2003 | Bonissone et al. | |
| 2003/0187702 A1 | 10/2003 | Bonissone et al. | |
| 2003/0208385 A1 | 11/2003 | Zander et al. | |
| 2003/0212654 A1 | 11/2003 | Harper et al. | |
| 2003/0217034 A1 | 11/2003 | Shutt | |
| 2003/0220879 A1 | 11/2003 | Gaughan et al. | |
| 2003/0225662 A1 | 12/2003 | Horan et al. | |
| 2003/0229553 A1 | 12/2003 | Kongyingyong et al. | |
| 2003/0229581 A1 | 12/2003 | Green et al. | |
| 2003/0233260 A1 | 12/2003 | Snell et al. | |
| 2003/0233316 A1 | 12/2003 | Hu et al. | |
| 2004/0002915 A1 | 1/2004 | McDonald et al. | |
| 2004/0019517 A1 | 1/2004 | Sennott | |
| 2004/0030616 A1 | 2/2004 | Florance et al. | |
| 2004/0030649 A1 | 2/2004 | Nelson et al. | |
| 2004/0034592 A1 | 2/2004 | Hu et al. | |
| 2004/0049439 A1 | 3/2004 | Johnston et al. | |
| 2004/0049445 A1 | 3/2004 | Kishore | |
| 2004/0059653 A1 | 3/2004 | Verkuylen et al. | |
| 2004/0064402 A1 | 4/2004 | Dreyer et al. | |
| 2004/0107161 A1 | 6/2004 | Tanaka et al. | |
| 2004/0122717 A1 | 6/2004 | Hancock | |
| 2005/0021390 A1 | 1/2005 | Porter et al. | |
| 2005/0027651 A1 | 2/2005 | DeVault | |
| 2005/0251475 A1 | 11/2005 | Sato | |
| 2006/0074793 A1 * | 4/2006 | Hibbert et al. | 705/38 |

FOREIGN PATENT DOCUMENTS

| | | |
|---|---|---|
| JP | 2002007701 | 1/2002 |
| JP | 2002259696 | 9/2002 |
| JP | 2002288426 | 10/2002 |
| JP | 2003223559 | 8/2003 |

| | | |
|---|---|---|
| WO | WO 9948036 | 9/1999 |
| WO | WO 0021011 | 4/2000 |
| WO | WO 0062209 | 10/2000 |
| WO | WO 0075833 | 12/2000 |
| WO | WO 0116845 | 3/2001 |
| WO | WO 0118718 | 3/2001 |
| WO | WO 01/27832 | 4/2001 |
| WO | WO 0133461 | 5/2001 |
| WO | WO 0139079 | 5/2001 |
| WO | WO 01/41019 | 6/2001 |
| WO | WO 0150318 | 7/2001 |
| WO | WO 0163445 | 8/2001 |
| WO | WO 0163446 | 8/2001 |
| WO | WO 0163534 | 8/2001 |
| WO | WO 0180123 | 10/2001 |
| WO | WO 0198999 | 12/2001 |
| WO | WO 02/06989 | 1/2002 |
| WO | WO 0208855 | 1/2002 |
| WO | WO 0223443 | 3/2002 |
| WO | WO 02/084925 | 10/2002 |
| WO | WO 02093286 | 11/2002 |
| WO | WO 03009152 | 1/2003 |
| WO | WO 03/071380 | 8/2003 |
| WO | WO 03/071388 | 8/2003 |

OTHER PUBLICATIONS

EDOCS, "edocs Teams with Fannie Mae to Offer Lenders Online Account Management Solution," Press Release, Mar. 12, 2001, 2 pgs., edocs, Inc., USA.

Fannie Mae, "Fannie Mae Unveils MORNETPlus on the Web; Lenders Can Now Access Automated Underwriting and Other Mortgage Transaction Services on Fanniemae.com," Press Release, Mar. 23, 2000, 2 pgs., Fannie Mae, USA.

Fannie Mae, "Fannie Mae Announces MORNETPlus Connections; Now Provides Lenders with Access to the Largest Network of Service Providers on the Web for Appraisals, Flood Certificates, Title Insurance and Closing, and Escrow Services," Press Release, Apr. 18, 2001, 3 pgs., Fannie Mae, USA.

Fannie Mae, "Fannie Mae and First American Financial to Provide Lenders with Electronic Access to More Products on MORNETPlus Network; Appraisals, Flood Certificates, and Title Insurance in Offering," Press Release, Dec. 21, 1999, 2 pgs, Fannie Mae, USA.

Raines Franklin D., "Statement by Franklin D. Raines Chairman and CEO of Fannie Mae, Speech at 2003 Fannie Mae eBusiness Forum," Sep. 17, 2003, 6 pgs, Fannie Mae, USA.

Object Management Group, "Fannie Mae", CORBA Banking/Finance, Sep. 17, 2001, 2 pgs, Object Management Group, Needham, MA, USA.

Smith Tom, "E-Commerce Holds Keys to Home Ownership: Fannie Mae drives hug volumes of mortgage business to its e-marketplace," Internetweek.com, Undated, 5 pgs., Internetweek.com, USA.

Smith Tom , "Fannie Mae Ramps up Web Apps: Q&A with Julie St. John , Executive Vice President and Chief Technology Office and Michael Williams President of Fannie Mae e-Business," Internetweek.com, Undated, 11 pgs., Internetweek.com, USA.

Sun, "Success on Sun: Software Development Case Study Federal National Mortgage Association (Fannie Mae)," Mar. 1995, 10 pgs, Sun, USA.

Raines Franklin D., "Speech by Franklin D. Raines Chairman and CEO of Fannie Mae, Fannie Mae and the Mortgage Industry in the E-Commerce Age," May 8, 2000, 20 pgs., Fannie Mae, USA.

Williams Michael, "Technology and Other Keys to the Boom in Refinancing," American Banker, Apr. 20, 2003, 3 pgs, vol. 168, Issue 63, p. 8., American Banker USA.

Breakthroughs in Mortgage Banking: Looking Toward the Future, Real Estate Finance Press, Mortgage Bankers Association of America, 1996, pp. 5-1-5-8, ISBN 1-57599-016-4, Jess Lderman, Editor.

Fannie Mae, "Delivering Loans for MBS", 1996, 138 pages, Fannie Mae, Washington, DC, USA.

Fannie Mae, "Guide to Underwriting with Desktop Underwriter", Oct. 1997, 152 pages, Verison 4.0, Fannie Mae, Washington, DC, USA.

Fannie Mae, "MORNET MBS Pool Submission System User's Guide", Sep. 1998, 259 pages, Version 5.3, Fannie Mae, Washington, DC, USA.

Fannie Mae, "Making Good Delivery A Guide to Delivering Loans for Cash and MBS", 1994, 121 pages, Fannie Mae, Washington, DC, USA.

Fannie Mae, "MORNET Cash Delivery System User's Guide", Nov. 1997, 177 pages, Version 2.6, Fannie Mae, Washington, DC, USA.

Fannie Mae, "Delivering Loans for Cash", 1997, 96 pages, Fannie Mae, Washington, DC, USA.

Fannie Mae, "MORNET Manager User's Guide", Nov. 1998, 187 pages, Version 3.0, Fannie Mae, Washington, DC, USA.

Fannie Mae, "MORNET Servicing Support System User's Guide", Dec. 1998, 370 pages, Fannie Mae, Washington, DC, USA.

Fannie Mae, "Selling", 1995-2002 et al, 1119 pgs, Fannie Mae, USA.

Fannie Mae, "Investor Accounting: Cash", 1996, 132 pages, Fannie Mae, Washington, DC, USA.

Fannie Mae, "Secondary Marketing: Cash", 1997, 81 pages, Fannie Mae, USA.

Fannie Mae, "General Servicing Fundamentals", 1996, 174 pages, Fannie Mae, USA.

Laser Overview, May 1993, chapters 1-18.

Fannie Mae, "Servicing Guide", 1995-2002 et al, 319 pages, Forward, Table of Contents, Sections III, IX, X, and XI, Fannie Mae, USA.

Ziobrowski et al: Higher real estate risk and mixed-asset portfolio performance, 1997, Journal of Real Estate Portfolio Management, vol. 3, No. 2, pp. 107-115.

Ebner et al. : The Value of real estate for a property portfolio, Leipzig Annual Civil Engineering Report (LACER), No. 2, 1997, pp. 459-467.

Byrne et al.: Risk reduction and real estate portfolio size, Managerial and Decision Economics, 2001, The University of Reading, UK, 22, pp. 369-379.

* cited by examiner

FIG. 6A

| | Product Type | Property Count | Unit Count | Loan Count | Deal Count | Current UPB | Watchlist UPB |
|---|---|---|---|---|---|---|---|
| | Appreciations | 14 | 1,875 | 14 | 3 | $ 94,812,777.35 | n/a |
| | Credit Enhanced Mortgages | 46 | 11,979 | 46 | 0 | $ 2,092,649,323.26 | n/a |
| | DUS Cash | 74 | 9,975 | 74 | 0 | $ 3,317,294,569.22 | n/a |
| | DUS MBS | 328 | 59,738 | 314 | 0 | $ 1,842,277,908.59 | n/a |
| | FHA Cash | 23 | 3,270 | 23 | 0 | $ 40,490,297.95 | n/a |
| | FHA MBS | 9 | 1,145 | 9 | 0 | $ 26,478,592.39 | n/a |
| | Hunie Maes | 6 | 458 | 6 | 0 | $ 9,826,832.03 | n/a |
| | NPA Cash | 1,151 | 75,147 | 1,140 | 2 | $ 2,602,450,958.39 | n/a |
| | NPA MBS | 18 | 1,184 | 18 | 0 | $ 20,472,481.04 | n/a |
| | NT Cash | 38 | 2,034 | 38 | 1 | $ 81,154,249.91 | n/a |
| | NT MBS | 702 | 41,178 | 702 | 18 | $ 1,087,691,742.23 | n/a |
| | Whole Loan Remics | 355 | 24,974 | 355 | 0 | $ 542,846,519.08 | n/a |
| | Total (12) | 2,763 | 232,755 | 2,738 | 22 | $ 8,758,585,039.42 | n/a |
| | Unique (12) | 2,763 | 232,755 | 2,738 | 22 | $ 8,758,505,039.42 | n/a |

| State | Bond Count | Unit Count | Property Count | Purchase Amount | Current UPB | Watchlist UPB | Hold For Maturity UPB | Available For Sale UPB |
|---|---|---|---|---|---|---|---|---|
| CALIFORNIA —1010 | 795 | 5,494 | 795 | $ 2,281,235,253.87 | $ 2,204,818,360.72 | | | |
| TEXAS | 365 | 33,999 | 365 | $ 1,641,537,672.08 | $ 1,606,976,862.25 | | | |
| VIRGINIA | 115 | 124,587 | 115 | $ 1,234,027,109.63 | $ 1,201,811,426.79 | | | |
| FLORIDA | 257 | 24,613 | 257 | $ 792,457,893.46 | $ 787,646,732.30 | | | |
| MASSACHUSETTS | 91 | 24,142 | 91 | $ 795,708,595.97 | $ 771,891,566.47 | | | |
| MINNESOTA | 160 | 2,802 | 160 | $ 670,214,376.72 | $ 664,118,091.14 | | | |
| ILLINOIS | 292 | 7,648 | 292 | $ 660,536,882.12 | $ 653,120,303.22 | | | |
| NEW YORK | 88 | 14,430 | 88 | $ 641,430,000.00 | $ 626,695,000.00 | | | |
| MARYLAND | 98 | 107,642 | 98 | $ 570,934,063.39 | $ 569,357,418.69 | | | |
| COLORADO | 133 | 4,956 | 133 | $ 526,508,826.54 | $ 513,263,236.67 | | | |
| OKLAHOMA | 180 | 0 | 180 | $ 497,418,875.97 | $ 476,005,143.42 | | | |
| PENNSYLVANIA | 71 | 1,095 | 71 | $ 483,765,268.37 | $ 456,518,889.98 | | | |
| GEORGIA | 94 | 5,230 | 94 | $ 406,956,013.74 | $ 397,068,686.15 | | | |
| WASHINGTON | 219 | 3,123 | 219 | $ 388,878,347.71 | $ 356,405,962.06 | | | |
| NEVADA | 85 | 4,628 | 85 | $ 367,070,000.00 | $ 351,975,000.00 | | | |
| TENNESSEE | 70 | 1,930 | 70 | $ 351,715,500.83 | $ 351,663,036.75 | | | |
| DISTRICT OF COLUMBIA | 84 | 6,860 | 84 | $ 332,818,999.99 | $ 319,644,000.00 | | | |
| LOUISIANA | 82 | 1,292 | 82 | $ 323,141,251.61 | $ 312,445,711.12 | | | |
| ALABAMA | 135 | 1,333 | 135 | $ 310,108,990.00 | $ 309,291,517.00 | | | |
| SOUTH DAKOTA | 32 | 3,950 | 32 | $ 307,440,000.00 | $ 307,440,000.00 | | | |
| MISSOURI | 81 | 8,199 | 81 | $ 298,288,285.86 | $ 292,993,734.97 | | | |
| MAINE | 35 | 2,380 | 35 | $ 292,985,000.00 | $ 292,985,000.00 | | | |

FIG. 10B

| Issuer — 1012 | CUSIP | Series | Available For Sale | Current UPB — 1014 | Property Name — 1016 | City/State | Fixed or Variable | Current Interest Rate | Standby/ Forward — 1018 | Product | Units Count |
|---|---|---|---|---|---|---|---|---|---|---|---|
| Issuer 1 | | 1999E | No | $ 4,565,000.00 (no name) | | CA | Unknown (null) | 5.45 % | Unknown (null)Unknown | Multifamily Bond | |
| Issuer 2 | | 1998C | Yes | $ 7,375,000.00 (no name) | | CA | Unknown (null) | 5.55 % | Unknown (null)Unknown | Multifamily Bond | |
| Issuer 3 | | 1998 AA | Yes | $ 5,380,000.00 (no name) | | CA | Unknown (null) | 5.40 % | Unknown (null)Unknown | Multifamily Bond | |
| Issuer 4 | | 2001 I | No | $ 11,725,000.00 (no name) | | CA | Unknown (null) | 5.35 % | Unknown (null)Unknown | Multifamily Bond | 333 |
| Issuer 5 | | 2000-h | No | $ 1,235,000.00 (no name) | | CA | Unknown (null) | 5.60 % | Unknown (null)Unknown | Multifamily Bond | |
| Issuer 6 | | 2000X-T | No | $ 1,440,000.00 (no name) | | CA | Unknown (null) | 7.45 % | Unknown (null)Unknown | Multifamily Bond | |
| Issuer 7 | | 2002 | No | $ 3,050,000.00 (no name) | | CA | Unknown (null) | 5.56 % | Unknown (null)Unknown | Multifamily Bond | 80 |
| Issuer 8 | | 2001 D-T | No | $ 2,495,000.00 (no name) | | CA | Unknown (null) | 7.13 % | Unknown (null)Unknown | Multifamily Bond | 150 |
| Issuer 9 | | 2001 B | No | $ 15,625,000.00 (no name) | | CA | Unknown (null) | 4.75 % | Unknown (null)Unknown | Multifamily Bond | 135 |
| Issuer 10 | | 2000 J | No | $ 1,129,984.00 (no name) | | CA | Unknown (null) | 6.87 % | Unknown (null)Unknown | Single Family Bond | |
| Issuer 11 — 1020 | | 2000 K | No | $ 909,333.00 (no name) | | CA | Unknown (null) | 7.02 % | Unknown (null)Unknown | Single Family Bond | |
| Issuer 12 | | 2000 K | No | $ 1,296,511.00 (no name) | | CA | Unknown (null) | 6.97 % | Unknown (null)Unknown | Single Family Bond | |

FIG. 10C

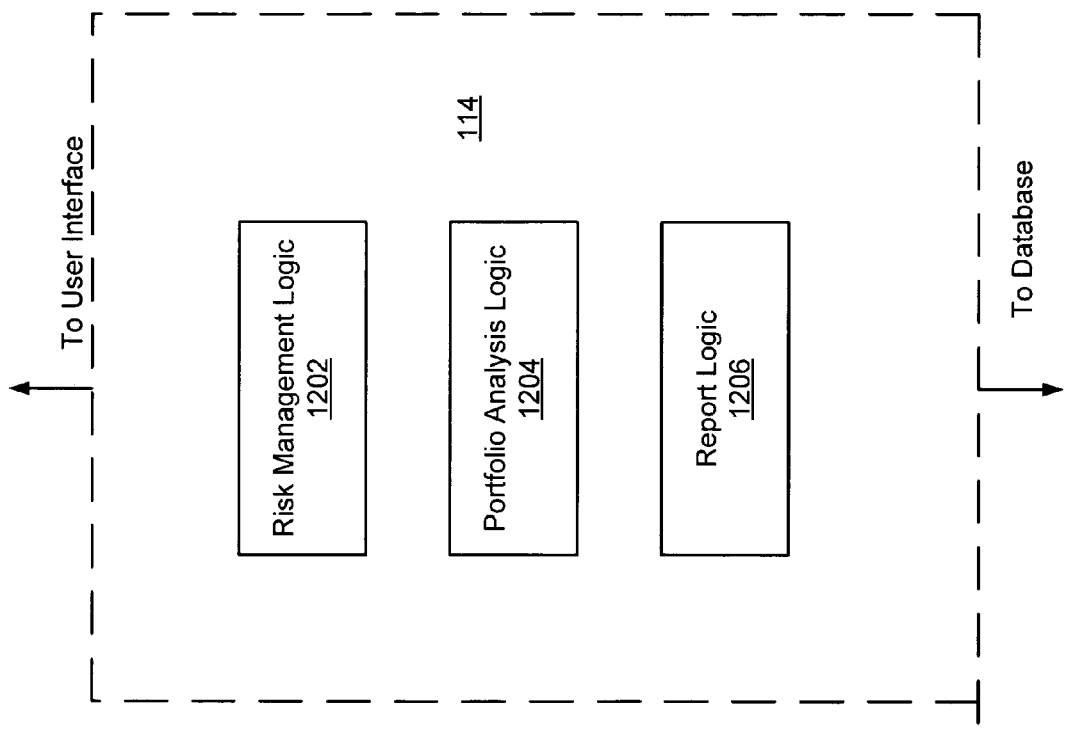

FINANCIAL STATEMENT ANALYTICS

| Fiscalyear | Fiscalqtr | Formtypecode | Tot Unts Cnt | Grosspotentialrent | Effectivegrossincome | Totaloperatingexpense | Netoper |
|---|---|---|---|---|---|---|---|
| 2001 | 0 | 0 | 227 | $4,164,876.00 | $3,773,935.00 | $1,291,245.00 | $2,4 |
| 2002 | 0 | 5 | 227 | $0.00 | $0.00 | $0.00 | |
| 2002 | 3 | 6 | 227 | $989,882.00 | $854,971.00 | $363,424.00 | $4 |
| 2002 | 4 | 6 | 227 | $990,562.00 | $868,952.00 | $401,159.00 | $4 |

| Fiscalyear | Fiscalqtr | Formtypecode | Tot Unts Cnt | Grosspotentialrent | Effectivegrossincome | Totaloperatingexpense | Netoper |
|---|---|---|---|---|---|---|---|
| 1996 | 0 | 0 | 26 | $220,419.00 | $227,206.00 | $77,478.00 | $1 |
| 1997 | 0 | 0 | 26 | $239,872.00 | $239,872.00 | $77,142.00 | $1 |
| 1998 | 0 | 0 | 26 | $250,506.00 | $250,506.00 | $64,632.00 | $1 |
| 1999 | 0 | 0 | 26 | $263,611.00 | $263,611.00 | $76,044.00 | $1 |
| 2000 | 0 | 0 | 26 | $280,386.00 | $280,386.00 | $86,863.00 | $1 |
| 2001 | 0 | 0 | 26 | $276,945.00 | $276,945.00 | $90,818.00 | $1 |

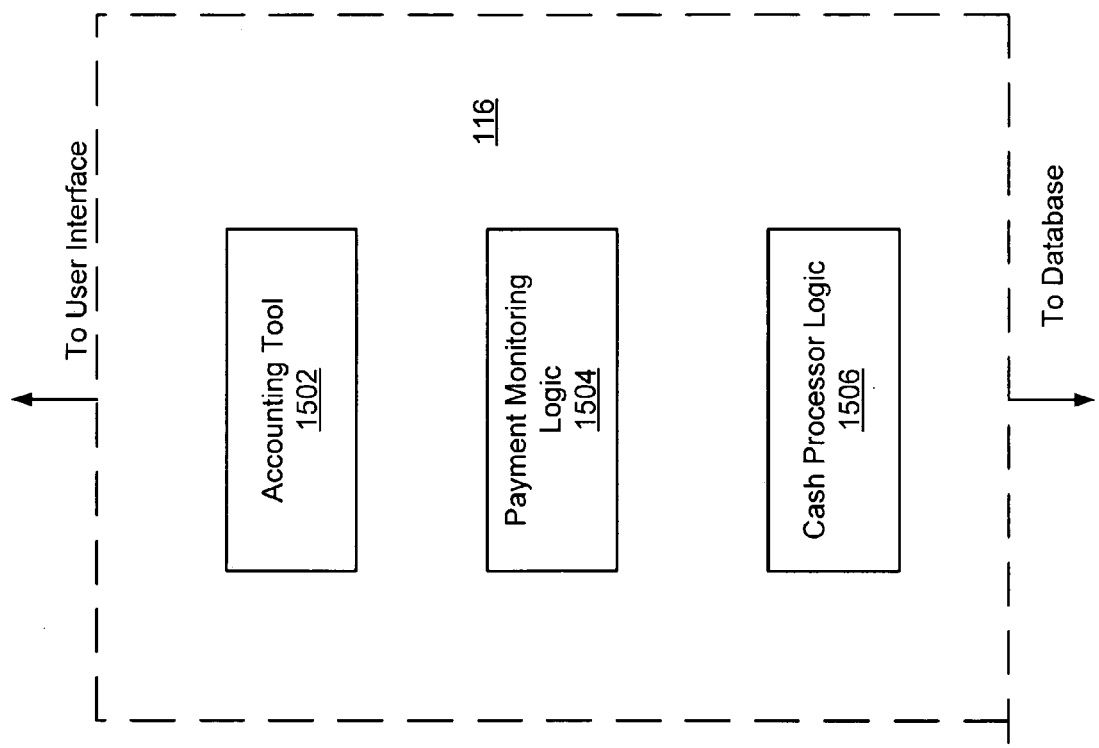

SYSTEM AND METHOD FOR MANAGING DATA PERTAINING TO A PLURALITY OF FINANCIAL ASSETS FOR MULTIFAMILY AND HOUSING DEVELOPMENTS

PRIORITY

This application claims the benefit of U.S. Provisional Application No. 60/533,566, filed Dec. 31, 2003, herein incorporated by reference in its entirety.

CROSS REFERENCE TO RELATED APPLICATIONS

This application is related to U.S. patent application Ser. No. 11/026,433 "Property Investment Rating System and Method," filed simultaneously herewith, and hereby incorporated by reference.

FIELD OF THE INVENTION

The present invention relates generally to computer systems and methods used to process and manipulate data pertaining to the mortgage industry such as potential borrowers, financial assets, e.g., loans, mortgage loans, securities, bonds and so on, and more particularly to a system and method for managing data pertaining to a plurality of financial assets for multifamily and housing developments.

BACKGROUND OF THE INVENTION

A multifamily property includes five or more residential units. Typically, the residential units of a multifamily property (or housing) are rental units for which a resident pays rent to the owner of the property. It is desirable for a community to have affordable rental housing. Because of the amount of money required to purchase a multifamily property (or housing), however, most purchasers do not have the funds to purchase a multifamily property outright on a cash basis. In addition, developers of housing developments including multifamily properties often must obtain financing in order to build or rehabilitate multifamily properties. Various types of investments, e.g., debt, equity or bonds, may be used to ensure, for example, a continual supply of funds for mortgage loans for multifamily housing, the availability of affordable rental housing, and the development of affordable housing in communities. For example, investors (e.g., pension funds, insurance companies, securities dealers, financial institutions and various other investors) in the secondary mortgage market may purchase mortgage loans for multifamily properties from lenders for cash or in exchange for mortgage backed securities or a Real Estate Mortgage Investment Conduit (REMIC). Alternatively, an investor may make equity investments in a housing development being built by non-profit or for-profit housing developers or an investor may purchase housing revenue bonds from state and local housing finance agencies. Financing through debt, equity and bond investments may also be used to help other parties involved in the development of multifamily housing such as housing finance agencies, governmental entities and non-profit housing sponsors.

An investor in multifamily properties and housing developments may hold a large portfolio of investments in multiple asset classes, e.g., debt, equity or bonds. In addition, an investor may have different types of investments in a single multifamily property over the life of the property. It would be advantageous to provide a data processing system that allows an investor to manage a plurality of investments in multifamily properties and housing developments in multiple financial asset classes. In addition, it would be advantageous to provide a data processing system that enables an investor to track and identify properties in which the investor may have made different types of investments over the life of the property.

SUMMARY OF THE INVENTION

In accordance with one embodiment, a data processing system for managing information related to a plurality of financial assets associated with housing and mortgage investments of an investor includes user interface logic configured to receive data regarding the plurality of financial assets including data regarding a plurality of properties associated with the plurality of financial assets and configured to provide access to the data regarding the plurality of financial assets, data management logic coupled to the user interface logic and configured to retrieve and process the data regarding the plurality of financial assets and a database coupled to the data management logic and the user interface logic and configured to store the data regarding the plurality of financial assets and to link data for a particular property of the plurality of properties across the plurality of financial assets. The data regarding each property in the plurality of properties including any associated financial assets is maintained across multiple transactions and for different counterparties.

In accordance with another embodiment, a user interface that provides access to a data processing system for managing information associated with housing and mortgage investments of an investor includes a plurality of data fields configured to receive data regarding the plurality of financial assets and to transfer the data to a database coupled to the user interface and a portfolio navigation tool configured to filter the data regarding the plurality of financial assets in the database based on filter categories including multiple asset classes including debt, equity and bond, geographic location, product type, property level data and transaction level data.

In accordance with another embodiment, a data processing system for managing information related to a plurality of financial assets associated with housing and mortgage investments of an investor includes user interface logic configured to receive data regarding the plurality of financial assets including data regarding a plurality of properties associated with the plurality of financial assets and configured to provide access to the data regarding the plurality of financial assets deal management logic coupled to the user interface logic and configured to receive and process data regarding a deal between the investor and a counterparty regarding at least one of the plurality of financial assets including evaluating exposure of the investor based on a plurality of types of data from the data regarding the plurality of financial assets and a database coupled to the deal management logic and the user interface logic and configured to store the data regarding the plurality of financial assets including the data regarding a deal. The database is configured to link data for a particular property of the plurality of properties across the plurality of financial assets.

In accordance with yet another embodiment, a data processing system for managing information related to a plurality of financial assets associated with housing and mortgage investments of an investor includes user interface logic configured to receive data regarding the plurality of financial assets including data regarding a plurality of properties associated with the plurality of financial assets and configured to provide access to the data regarding the plurality of financial assets, trend and analysis logic coupled to the user interface logic and configured to process data regarding the plurality of financial assets and provide risk management results and a database coupled to the trend and analysis logic and the user interface logic and configured to store the data regarding the plurality of financial assets and risk management results. The database is configured to link data for a particular property of the plurality of properties across the plurality of financial assets.

In accordance with a further embodiment, a data processing system for managing information related to a plurality of financial assets associated with housing and mortgage investments of an investor includes user interface logic configured to receive data regarding the plurality of financial assets including data regarding a plurality of properties associated with the plurality of financial assets and configured to provide access to the data regarding the plurality of financial assets, cash flow management logic coupled to the user interface logic and configured to perform cash flow accounting across the plurality of financial assets and a database coupled to the cash flow management logic and the user interface logic and configured to store the data regarding the plurality of financial assets. The database is configured to link data for a particular property of the plurality of properties across the plurality of financial assets.

Other features and advantages of the present invention will become apparent to those skilled in the art from the following detailed description and accompanying drawings. It should be understood, however, that the detailed description and specific examples, while indicating preferred embodiments, are given by way of illustration and not limitation. Many modifications and changes within the scope of the present invention may be made without departing from the spirit thereof, and the invention includes all such modifications.

BRIEF DESCRIPTION OF THE DRAWINGS

The invention will be more readily understood by reference to the following description taken with the accompanying drawings, in which:

FIG. 6A shows an exemplary user interface for data regarding debt assets for an investor in accordance with an embodiment.

FIG. 6B shows an exemplary user interface for data regarding debt assets for an investor in accordance with an alternative embodiment.

Figure 7A:
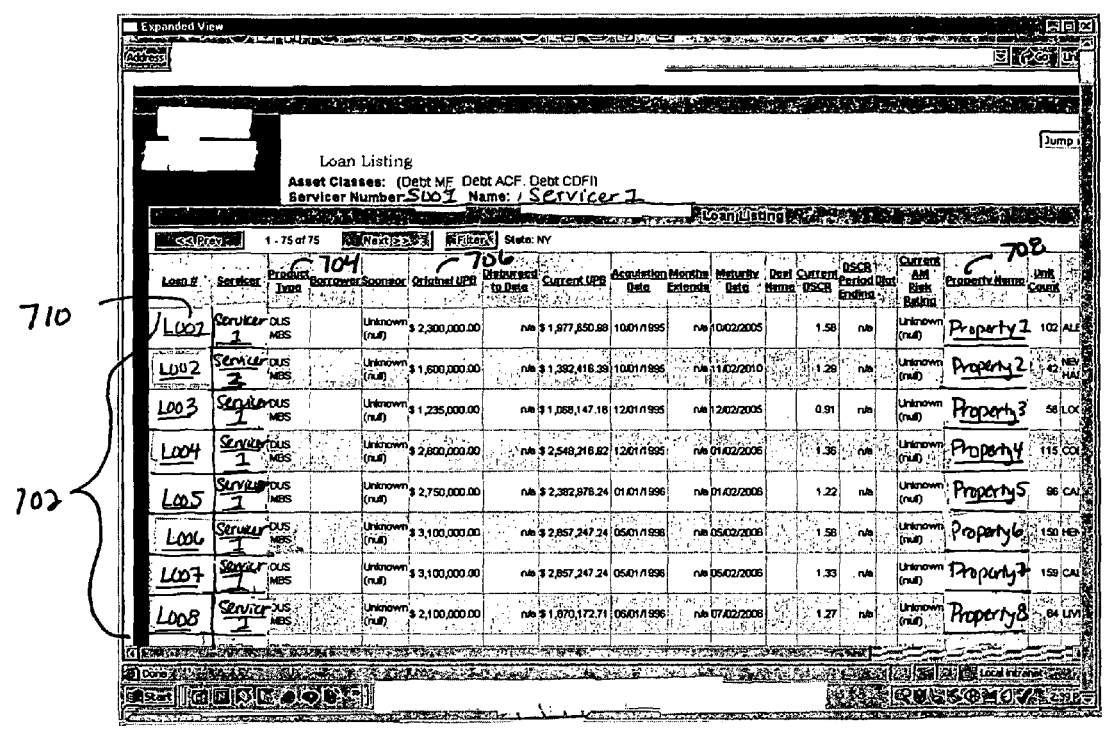
Figure 7C:
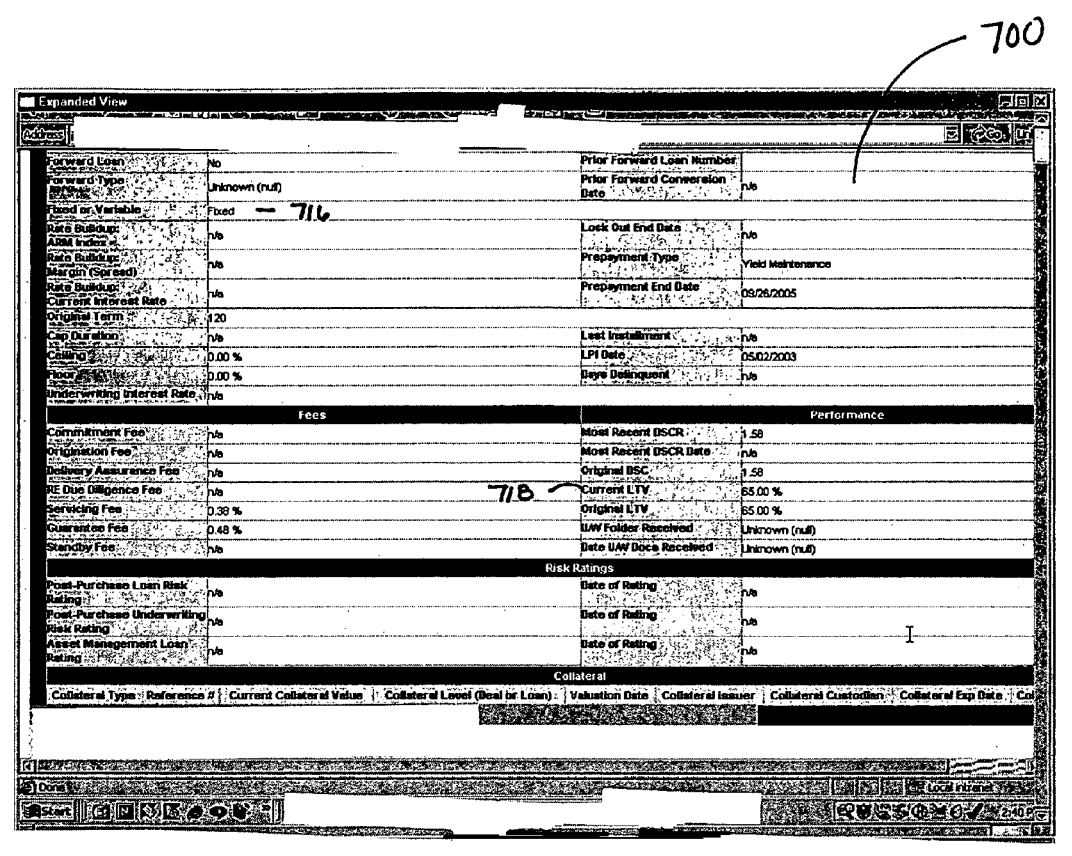

FIGS. 7A-7D show exemplary user interfaces for viewing data regarding loan details for loans related to financial assets of an investor in accordance with an embodiment.

FIGS. 8A and 8B show exemplary user interfaces for viewing data regarding property details for properties related to financial assets of an investor in accordance with an embodiment.

FIGS. 9A-9E show an exemplary user interface for data regarding equity assets for an investor in accordance with an embodiment.

FIGS. 10A-10D show an exemplary user interface for data regarding bond assets for an investor in accordance with an embodiment.

FIG. 12 is a block diagram of the trend and analysis logic of the system in FIG. 1 in accordance with an embodiment.

FIGS. 13B-13E are exemplary reports generated by report logic of the trend and analysis logic of FIG. 12 in accordance with an embodiment.

FIGS. 14A-C show exemplary user interface providing a listing of available reports in accordance with an exemplary embodiment.

FIG. 15 is a block diagram of the cash flow management logic of the system in FIG. 1 in more detail in accordance with an embodiment.

DETAILED DESCRIPTION OF THE PREFERRED EMBODIMENTS

Figure 1:
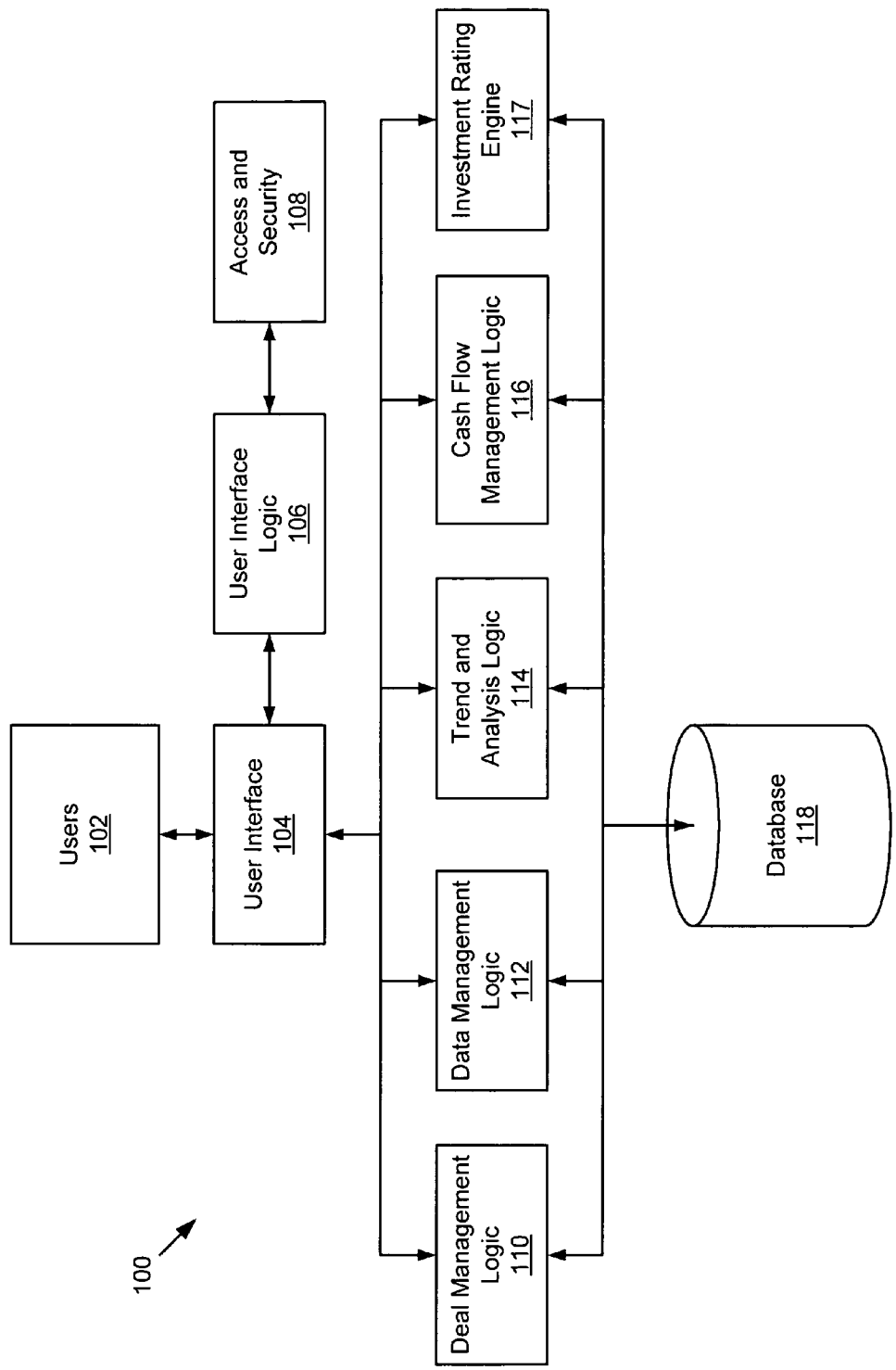
FIG. 1 is a block diagram of a data processing system according to an embodiment.

FIG. 1 is a block diagram of a data processing system in accordance with an embodiment. Data processing system 100 includes a user interface 104, user interface logic 106, access and security logic 108, deal management logic 110, data management logic 112, trend and analysis logic 114, cash flow management logic 116 and a common database 118. Preferably, deal management logic 110, data management logic 112, trend and analysis logic 114 and cash flow management logic are provided on a single integrated data processing platform. Herein, although the term "logic" is used in connection with some blocks and the term "processor" is used in connection with other blocks, theses two terms are used interchangeably. The term "processor" is used in the generic sense and is not meant to imply a separate discrete unit of processing hardware.

Data processing system 100 is configured for processing data pertaining to a plurality of financial investments or assets (e.g., debt, equity or bonds) in multifamily properties (or housing) and housing developments. As used herein a "multifamily property" or "multifamily housing" means a property composed of five or more residential units. In one embodiment, data processing system 100 is configured to be used by multiple users 102 of an investor, such as a participant in the secondary mortgage market. Data processing system 100 is preferably useable to support various types of transactions or functions which may be executed by such an investor in connection with one or more financial assets or investments such as managing deals used to create an investment, managing the data related to the plurality of assets (e.g., debt, equity, bonds), analyzing data related to the financial assets for risk management, managing cash flows associated with the financial assets, etc.

It will be appreciated that data processing system 100 may perform fewer or additional functions as compared to those described herein. For example, an entity that performs only some of the above-mentioned processes may use a computer system that contains only a subset of the functions described herein. Herein, it will be assumed that data processing system 100 is used to support each of the business processes described herein.

It should also be apparent that it is also possible to construct data processing systems which do not incorporate the advantages described herein in connection with data processing system 100, or which also incorporate additional advantages not described herein. Further, it may also be noted that the separation of functionality shown in FIGS. 1-15 is necessarily to some extent conceptual, and it is also possible to provide the same functionality in other ways. Additionally, although numerous functions are described below, it may be noted that it may be desirable to provide fewer, additional, or different functions in a given data processing system depending on the application and what is needed.

Referring again to FIG. 1, database 118 is configured to store data regarding a plurality of financial assets or investments (e.g., debt, equity or bonds) related to multifamily properties and housing developments. An example of a debt investment is the purchase of a mortgage loan for a multifamily property or the creation of a mortgage backed security or REMIC using multiple multifamily mortgage loans. An example of an equity investment is the purchase of equity by an investor in a multifamily property or housing development that qualifies for federal low income housing tax credits (LIHTC). Such an equity investment may provide capital to a developer to finance the construction of multifamily housing. An example of a bond investment is the purchase of a multifamily housing revenue bond from state and local housing agencies.

The financial asset data stored in database 118 may include both general information regarding each asset class as well as specific details for each asset. For each asset class, database 118 may store, for example, asset class or type (e.g., debt, equity or bond), property count for each type of asset, unit count for each type of asset, transaction count for each type of asset, product type (e.g., cash, MBS, REMIC), unpaid balance, counterparties (e.g., lender, broker, borrower, developer, servicer, syndicator, etc.), documents, etc. For each debt investment, database 118 may store data such as product type, borrower, unpaid balance, loan count for each product type, servicer associated with a deal or loan, acquisition date, maturity date, property identifier, unit count, loan status, loan purpose, loan type, fixed or variable, interest rate, loan-to-value, guarantee fee, commitment fee, etc. For each asset or investment, database 118 may store property data such property name, property status, location (e.g., city, state, etc.), related investments, active investments for the property, historical investments for the property, year built, number of units, property management company, property type, property description, inspections and financials for a property, etc. For each equity investment, database 118 may store data such as investment name, equity fund, syndicator, investment alias, investment type, committed gross equity, closed gross equity, ownership percentage, current investment balance, fund properties, etc. For each bond investment, database 118 may store data such as product type, bond count, purchaser amount, current unpaid balance, issuer, series, property name, fixed or variable, interest rate, bond rating, maturity date, risk rating, etc.

Database 118 is also configured to store other detailed data regarding deals and the property associated with a deal at closing and throughout the life of the property such as cash flow structures, deal terms and triggers, collateral and fees, each parties' tax credits, other external obligations, electronic deal related documents, e-signatures, etc. Database 118 may also be configured to store data related to tracking events related to a property, for example, the creation of an easement, including the status of the event (e.g., the status of the approval process for the easement) over the life of the property. Data in database 118 is accessible throughout the data processing system 100. As discussed below, each user may access data from database 118 based on a registration profile. Accordingly, the type of data that is available to and shared with each user may be controlled.

Preferably, database 118 is configured to link a property to any investment by the investor in that property in any investment class and to conduct searches of the stored data based on the property. For example, over the life of a property, an investor may have an equity investment with a developer when the property was constructed, a first debt investment by purchasing a mortgage loan associated with the purchase of the property by a first owner and a second debt investment by purchasing a mortgage loan associated with a second mortgage or a mortgage loan associated with the purchase of a property by a second owner. Accordingly, the investor may be able to determine the performance of a property under both current and historical investments across multiple asset classes. Other types of data may be related and linked in database 118. This information may be used by an investor in assessing new deals or investments.

In addition, database 118 is configured to link a counterparty to any investment by the investor with that counterparty in any investment class and to conduct searches of the stored data based on the counterparty. For example, an investor may have an equity investment with a counterparty for a first property, a debt investment with the counterparty for a second property and a debt investment with the counterparty for a third property. Accordingly, the investor may be able to determine the performance of a counterparty under both current and historical investments across multiple asset classes. As mentioned above, this information may be used by an investor in assessing new deals or investments.

Access and security logic 108 in connection with user interface 104 (described below) and user interface logic 106 (described below) is used to register individual users associated with an investor to be able to use the data processing system 100. A registration template may be presented to a user on user interface 104. For example, an employee of the investor may be given a login name and password to access the data processing system 100. User registration preferably includes providing each user with an authorization profile that defines the extent and type of access the user is given to the data processing system 100, the types of operations that the user may perform and the types of data the user may retrieve and/or view while accessing the data processing system 100. The access and security logic 108 also controls the access of users to the data processing system 100 based on the user's authorization. This also allows separation between asset classes such as debt and equity and the separation of users able to access data for certain asset classes to be maintained.

User interface 104 and user interface logic 106 provide a user interface to data processing system 100. Preferably, a user 102 accesses data processing system 100 through an Intranet or local area network by using a personal/laptop computer or other suitable network-enabled device. For example, data processing system 100 may be accessible to users 102 (e.g., an employee of the Investor) via an Intranet and clicking on the appropriate links located at the web site or Intranet. Also, all logic data could reside within a desktop computer, e.g., a shadow copy of the data stored on a network is processed locally and then updated on the network. Depending on the authorizations the user 102 has been given in a registration in access and security logic 108, the user 102 is able to access different web pages of the web site or Intranet relating to the deal management logic 110, data management logic 112, trend and analysis logic 114 and cash flow management logic 116. For example, there may be one or more pages relating to creating a deal with a counterparty using deal management logic 110. User interface logic 106 may be used to generate and present the appropriate display or web page to a user 102 via user interface 104. User 102 may then perform functions in accordance with what is permitted by the user's authorization profile (which, in turn, is typically based on the user's job function). For example, a user may be given authorization to access web pages associated with the cash flow management logic 116. Alternatively, user interface 104, deal management logic 110, data management logic 112, trend and analysis logic 114 and cash flow management logic 116 may be provided locally on a computer associated with each user 102 and the database 118 may be accessed via a data connection such as through an Intranet or a local area network. The types of operations that different users may perform is described in greater detail in connection with FIGS. 2-14 below.

Alternatively, if it is desired to make the system 100 accessible to other parties, such as developers, the system may be made available via secure link to the Internet, e.g., a secure link to the investor's web site (that is, a web site of the entity that owns/operates data processing system 100, and that is assumed to be in the business of investing in multifamily property and housing developments). In addition, in another embodiment, electronic links may be provided to receive data from external systems and counterparties. For example, a link may be provided to allow a counterparty to provide data that may be stored in database 118.

Figure 2:
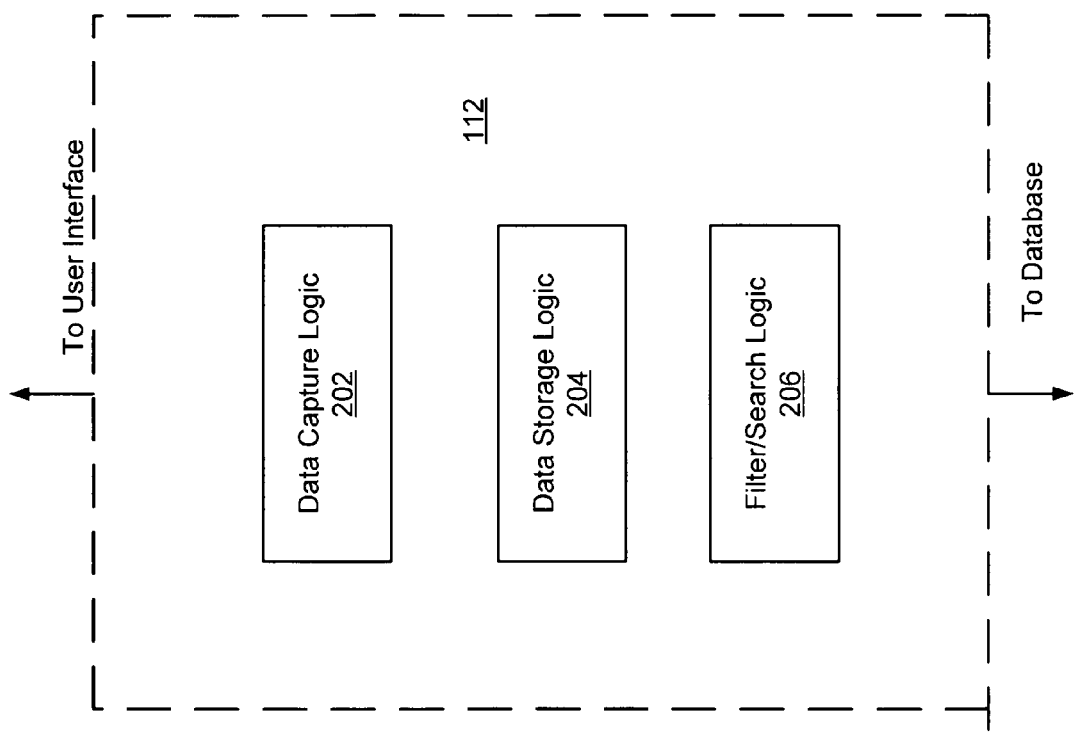
FIG. 2 is a block diagram showing the data management logic of the system in FIG. 1 in accordance with an embodiment.

User interface 104 is used in conjunction with and interacts with data management logic 112 to perform functions such as receiving data related to a financial asset, submitting data to the database 118, retrieving data from the database 118, processing data from the database 118 and displaying data from the database 118. User interface 104 also interacts with deal management logic 110, trend and analysis logic 114 and cash flow management logic 116. FIG. 2 is a block diagram showing the data management logic of the system in FIG. 1 in accordance with an embodiment. Data management logic 112 includes data capture logic 202, data storage logic 204 and filter/search logic 206. A user may enter data related to a financial asset via user interface 104. Data capture logic 202 receives the data entered via user interface 104 and may also be used in conjunction with deal management logic 110 or cash flow management logic 116. For example, deal management logic 110 in conjunction with user interface 104 may be used to receive data related to the creation of a deal regarding a financial asset (e.g., the purchase of a mortgage loan for a multifamily property). User interface 104 may be used to present, for example, a web page that provides user 102 with data fields and prompts for the entry of data related to the financial asset. Data entered by user(s) 102 is submitted to data capture logic 202. Data may also be received from other sources, such as other internal investor systems or external systems. Accordingly, data management logic 112 and/or database 118 may be coupled to other internal investor systems or external systems that provide financial asset data.

Data capture logic 202 submits the received data to data storage logic 204 which may be used to forward the data to database 118. Data storage logic 204 may also be configured to format non-standard data in non-standard formats (as opposed to, for example, usual quarterly/annual financials) into preferred formats before storage in database 118. In addition, data storage logic is configured to store data in a variety of formats including non-standard forms, e.g., memos, e-mails, documents (e.g., in text (Word) format or as an image (PDF)), e-signatures, etc. Non-standard data such as documents may be associated with a property and/or a deal, e.g., so a user can pull up all non-standard documents associated with a particular property. For example, a user may select a link or tab 728 (shown in FIG. 7D) to view documents associated with loan property.

Filter/search logic 206 interacts with user interface 104 to allow a user 102 to search, filter and retrieve data from database 118. User interface 104 and filter/search logic 206 provide a portfolio navigation tool that may be used to filter, search and manipulate data from database 118. Data may be accessed, for example, on a deal, line of business, portfolio, asset class, counterparty and property level. For example, a user may view (1) details of servicers in a particular state, (2) details of the loans for a particular servicer, (3) details of a specific loan of the servicer including the property or properties attached to the loan or (4) details of a property including the loans on the property, who holds the loans, etc.

Figure 3:
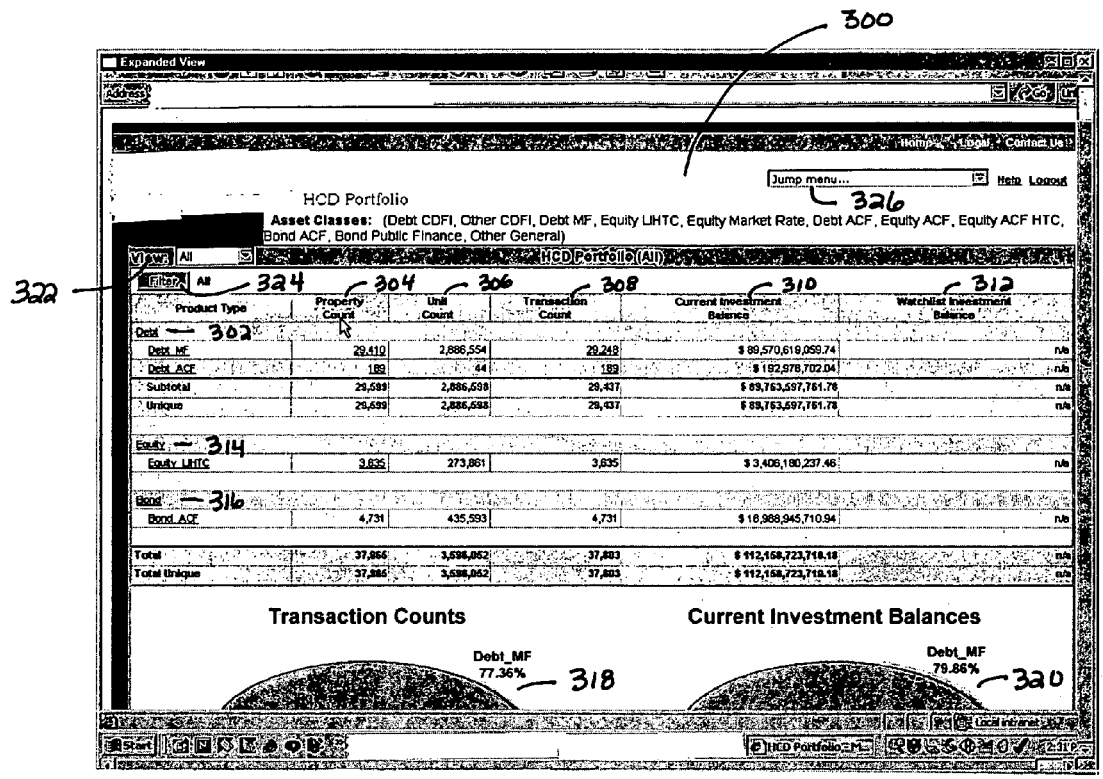
FIG. 3 shows an exemplary user interface for an overall investment portfolio view of financial assets of an investor in accordance with an embodiment.
Figure 4:
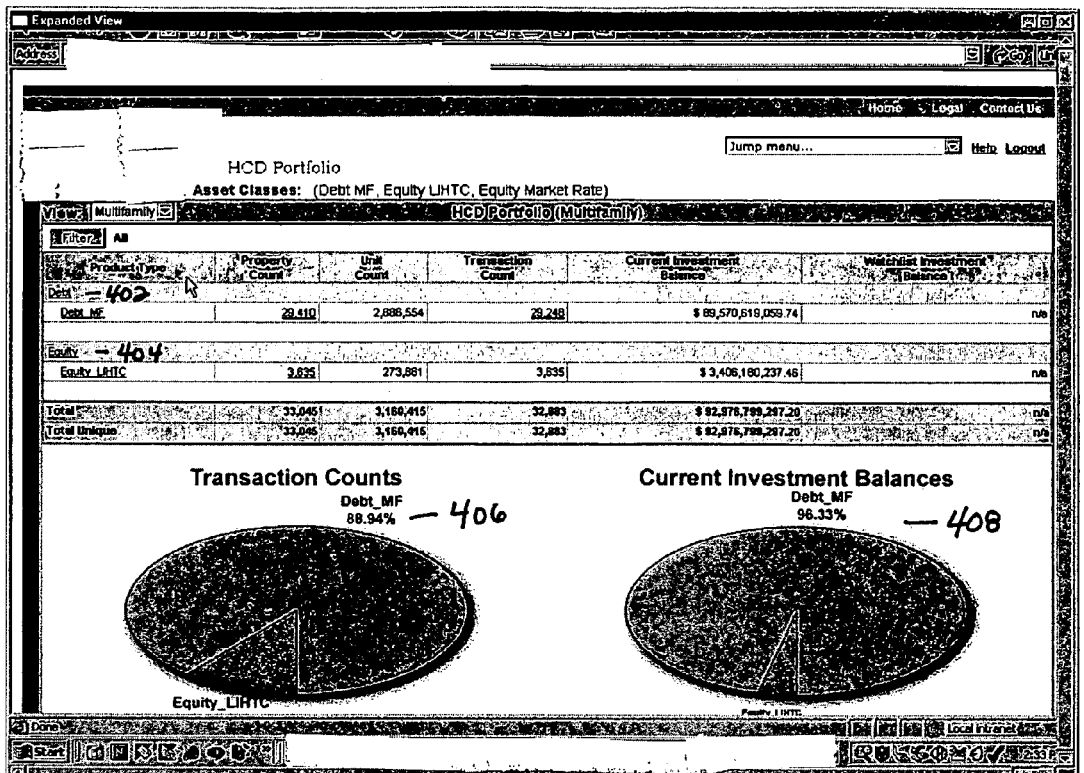
FIG. 4 shows an exemplary user interface for a summary of a multifamily investment portfolio of financial assets of an investor in accordance with an embodiment.

FIG. 3 shows an exemplary user interface for an overall investment portfolio view of financial assets of an investor in accordance with an embodiment. As mentioned, a user may start at a general overview of an asset class for an investor and then drill down into the related data. At the property or counterparty level, a user may also move across asset classes to see other assets related to a particular property or counterparty. In FIG. 3, summary information regarding an investment portfolio is shown including a summary of various types of debt investments 302, types of equity investments 314 and types of bond investments 316 including a property count 304, a unit count 306, a transaction count 308, current investment balance 310 and watchlist investment balance 312. In addition, graphical representations of the summary data such as transaction counts 318 and current investment balances 320 may also be shown. User interface 104, user interface logic 106 (both shown in FIG. 1) and filter/search logic 206 (shown in FIG. 2) interact to provide the display of financial asset data as requested by user 102. The user interface 300 includes a view menu 322, a filter 324 and other menus 326 that a user may select to obtain more detailed or additional data for each type of asset. Preferably, menus, filters and links provided in the user interface screens enable a user to drill down in the financial asset data stored in database 118 (shown in FIG. 1). For example, a user may select a multifamily option from the view menu 322 to view summary data for financial assets related to a multifamily portfolio as shown in FIG. 4. FIG. 4 shows summary data for financial assets of the investor, e.g., debt investments 402 and equity investments 404, for multifamily properties. Graphical representations of the summary data such as transaction counts 406 and current investment balances 408 may be displayed.

Figure 5A:
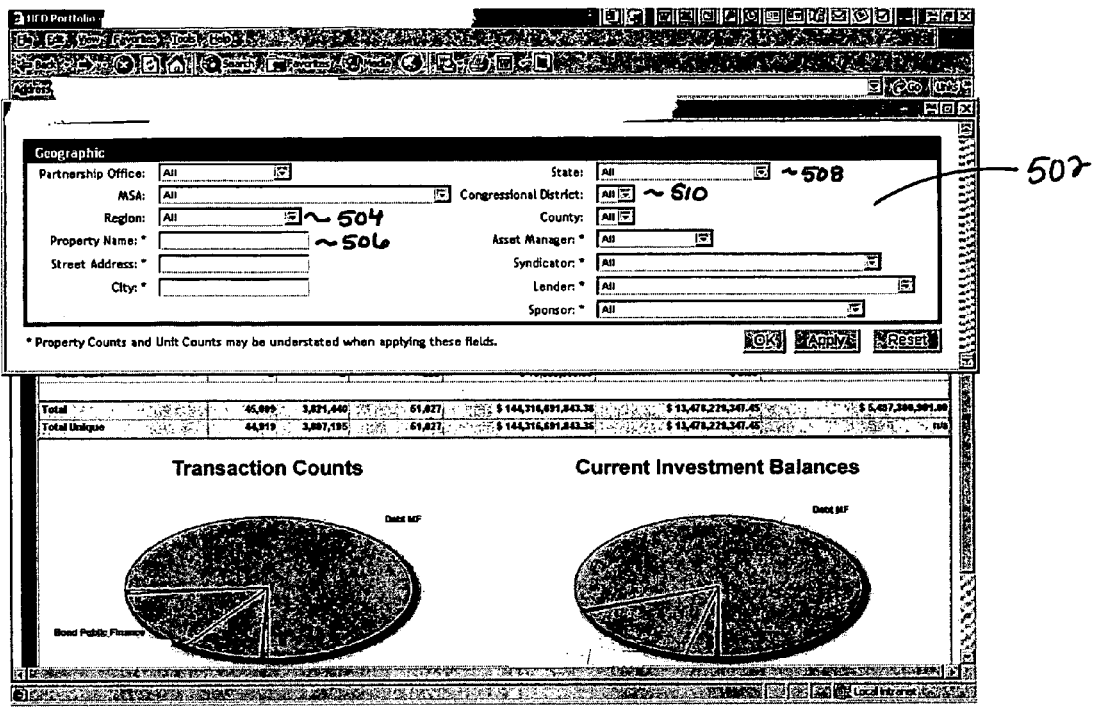
FIG. 5A shows an exemplary filter template 502 in accordance with an embodiment.
Figure 5B:
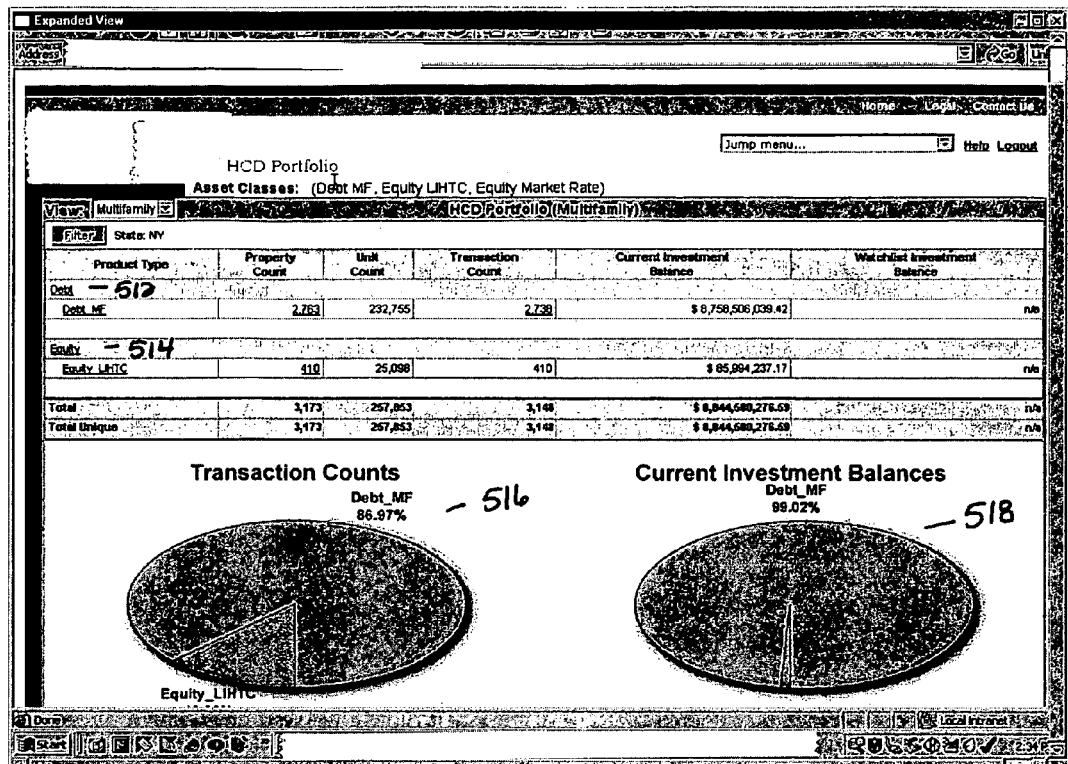
FIG. 5B shows an exemplary user interface resulting from a filter template selection in accordance with an embodiment.
Figure 7B:
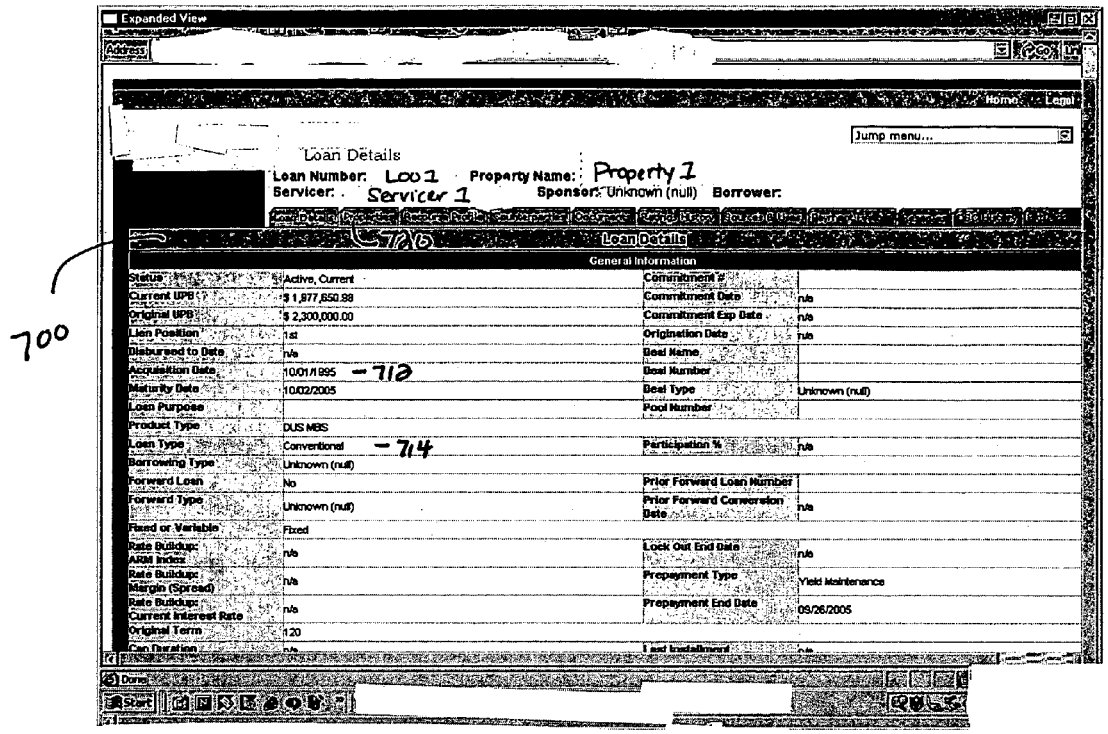
Figure 7D:
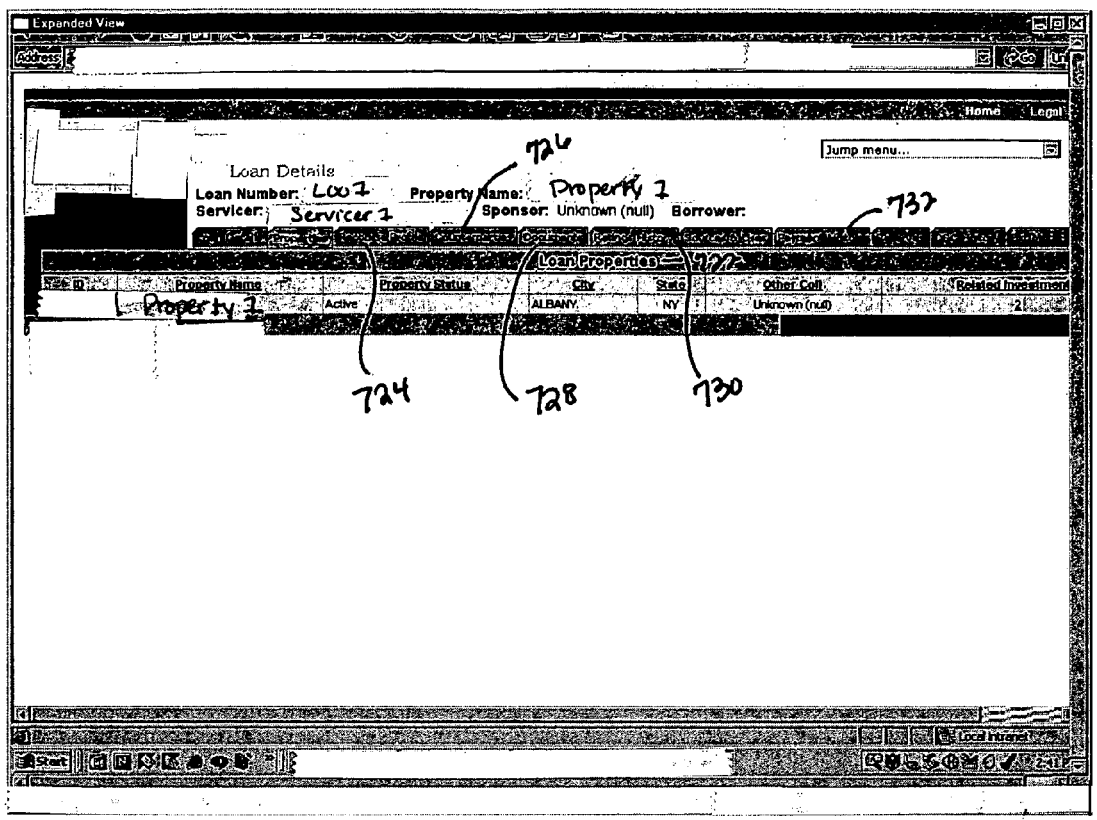

As mentioned above, a filter tool 324 may also be used to drill down and filter the financial asset data to be viewed. FIG. 5A shows an exemplary filter template 502 in accordance with an embodiment. Filter template 502 may provide a user with options to filter the financial asset data based on, for example, region 504, property name 506, state 508, congressional district 510, etc. For example, a user may select to view multifamily financial assets for the state of New York as shown in FIG. 5B. In FIG. 5B, summary data for financial assets, e.g., debt investments 512 and equity investments 514, for multifamily properties in the state of New York are shown. Graphical representations of the summary data such as transaction counts 516 and current investment balances 518 may also be displayed.

Figure 6B:
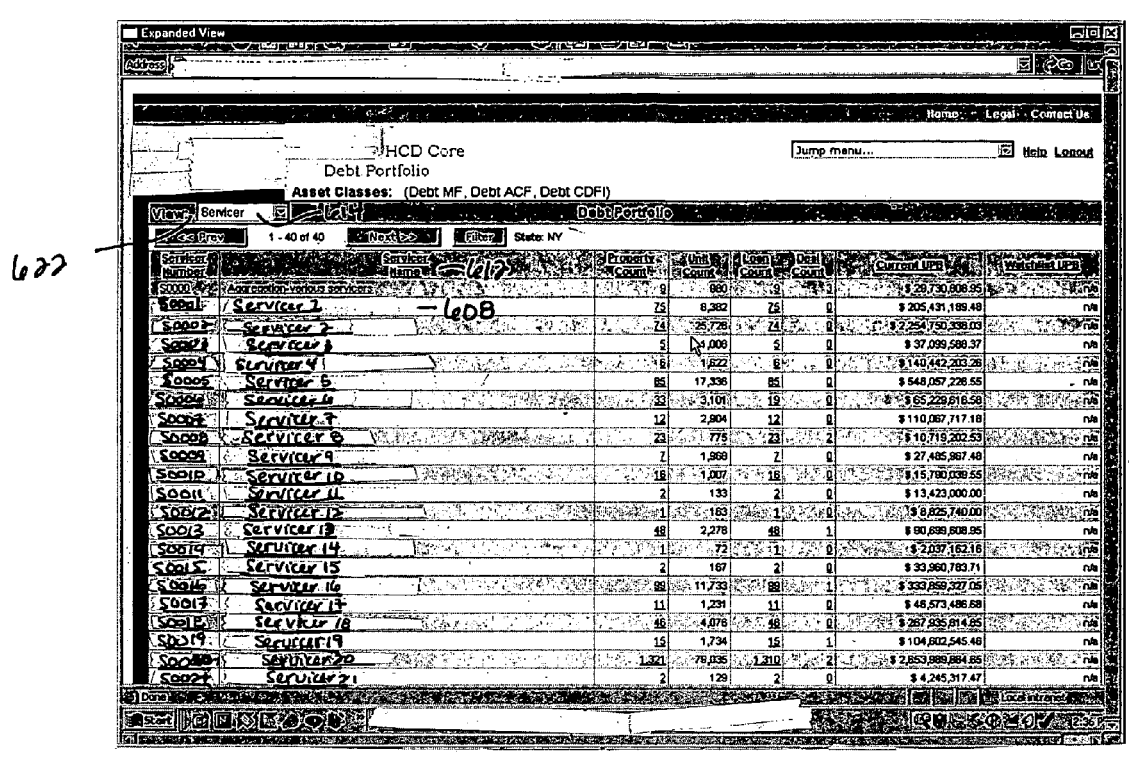

FIGS. 6A-8 illustrate exemplary user interfaces used in accessing and viewing data related to debt investments. A user 102 (shown in FIG. 1) may select to view further details of, for example, data regarding a debt investment portfolio as shown in FIGS. 6A and 6B. For example, by selecting the debt link 512 (shown in FIGS. 5A, 5B) and a view by product type 604 using view menu 622, a user may view details of debt asset product types 602 for debt investments in the state of New York as shown in FIG. 6A. Additional information such as loan count 606 for each product type may also be shown. Alternatively, a user may select to view the debt asset data by servicer 612 using a servicer option 614 from the view menu 622 as shown in FIG. 6B. A link 608 (or links, e.g., a link for each servicer) may be provided to view a listing of loans associated with a particular servicer. In addition, a link may be provided to view other specific details of data related to a particular servicer. An exemplary user interface including a loan listing is shown in FIG. 7A. Individual loans 702 are listed along with data for each loan such as product type 704, original unpaid balance 708, property name 708, etc. Preferably, multiple links are provided with each user interface to facilitate further filtering and selection of the financial asset data. For example, links (e.g., link 710) may be provided to view specific details of a particular loan as shown in FIGS. 7B and 7C. As shown in FIGS. 7B and 7C, specific loan details such as acquisition date 712, loan type 714, fixed or variable 716, loan-to-value 718, etc. may be provided on user interface 700. In addition to specific loan details, user interface 700, as shown in FIG. 7B, also includes a tab 720 or link that provides a view of data regarding the property or properties associated with the specific loan as shown in FIG. 7D. In FIG. 7D, a user may also use tabs or links to access data such as recourse profile 724, counterparties 726, documents 728, ratings history 730, payment history 732, etc associated with a particular loan or property. As discussed above, in one embodiment, electronic documents or scanned original documents may be stored in database 118 (shown in FIG. 1) and associated with a particular loan, a particular property, etc. A link, e.g., link 728 (shown in FIG. 7D), may be used to view documents associated with a loan. Referring to FIG. 7D, a listing of loan properties 722 is shown for the specific loan shown in FIGS. 7B and 7C.

Figure 8A:
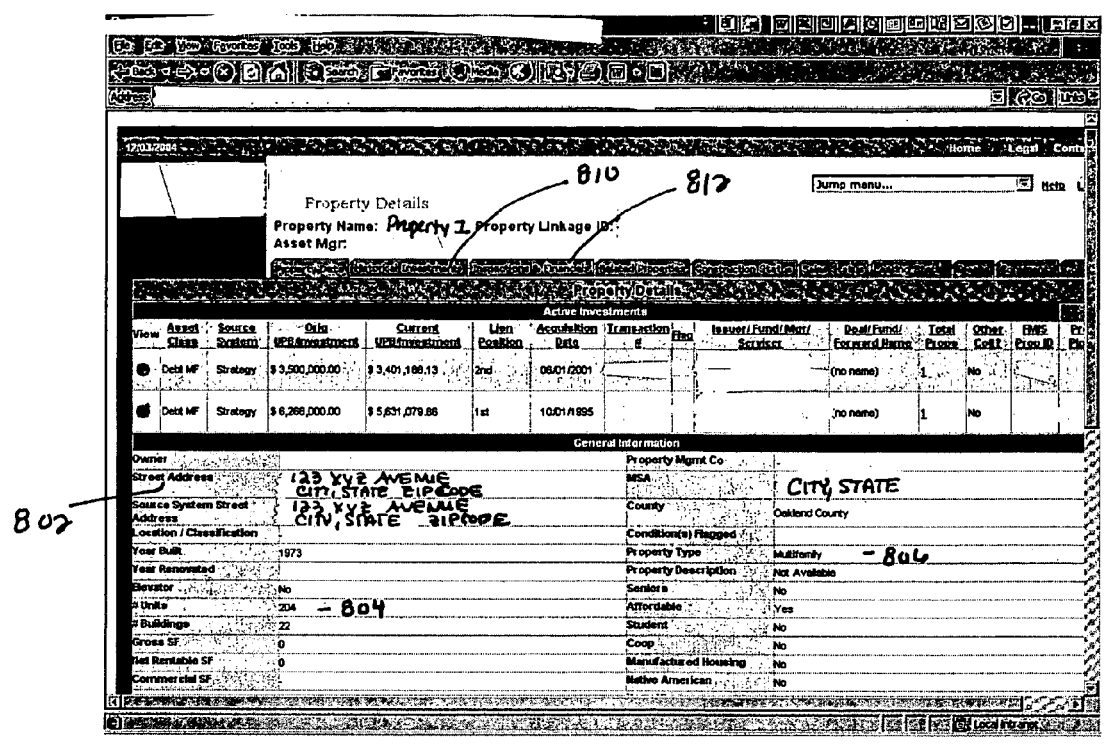
Figure 8B:
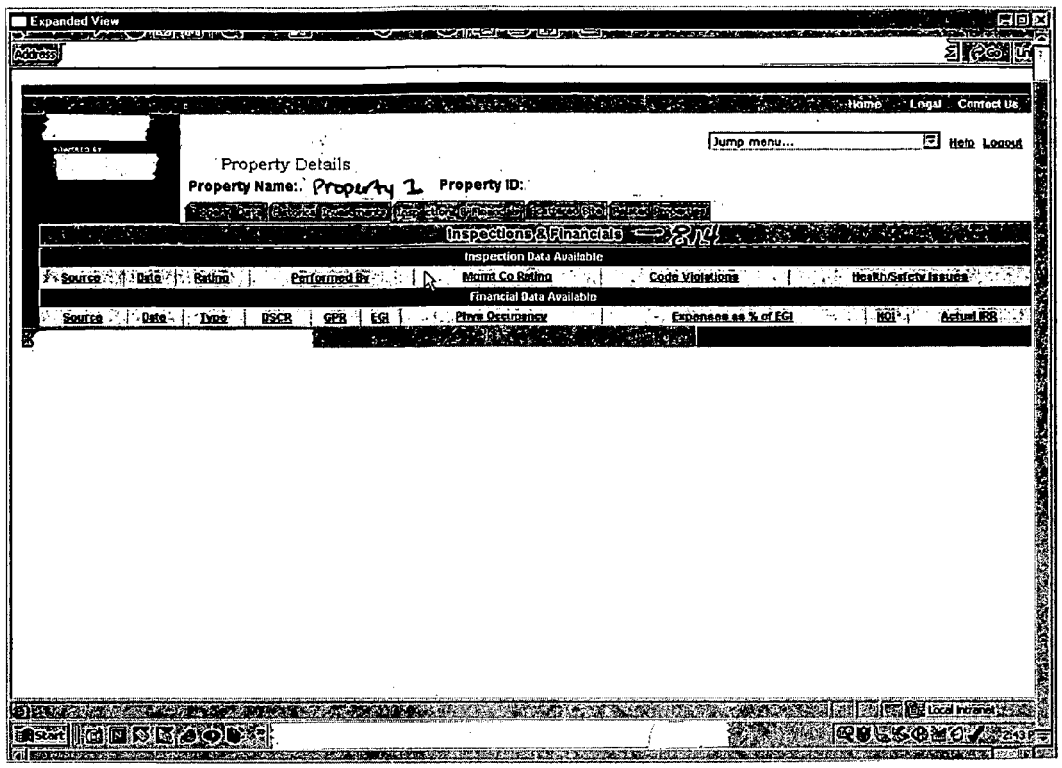

User interface 104 (shown in FIG. 1) and filter/search logic 206 (shown in FIG. 2) preferably also allow a user to view property details for a property associated with a loan or loan(s) as shown in FIGS. 8A and 8B. Property data such as street address 802, number of units 804, property type 806, etc. may be displayed. In addition, the user interface advantageously also displays all active investments 808 (and related details) associated with the property. In addition, a user may view historical investments for the property by selecting a link or tab 810. As mentioned previously, database 118 (shown in FIG. 1) is configured to link a property to any investment by the investor in that property in any investment class over the life of the property. In addition, data such as inspections and financials may be displayed by selecting a link or tab 812. When link 812 is selected, a display such as shown in FIG. 8B may be provided to show inspection and financial data 814 for a particular property.

Figure 9A:
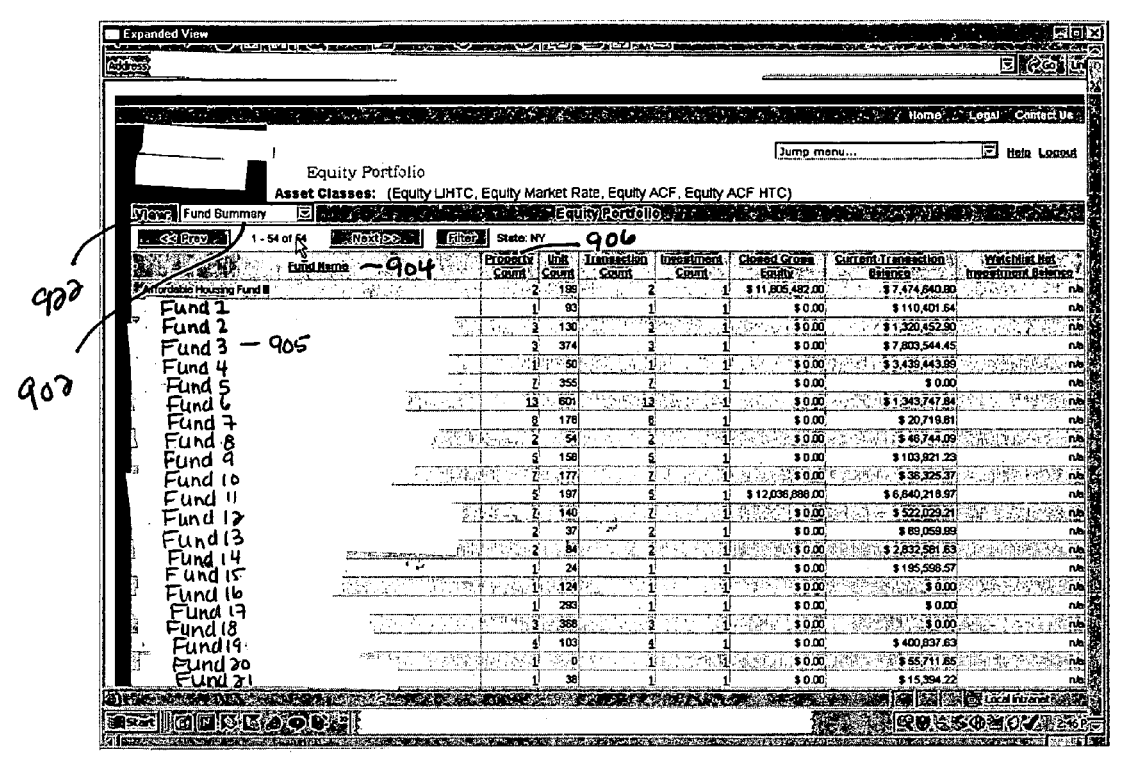
Figure 9B:
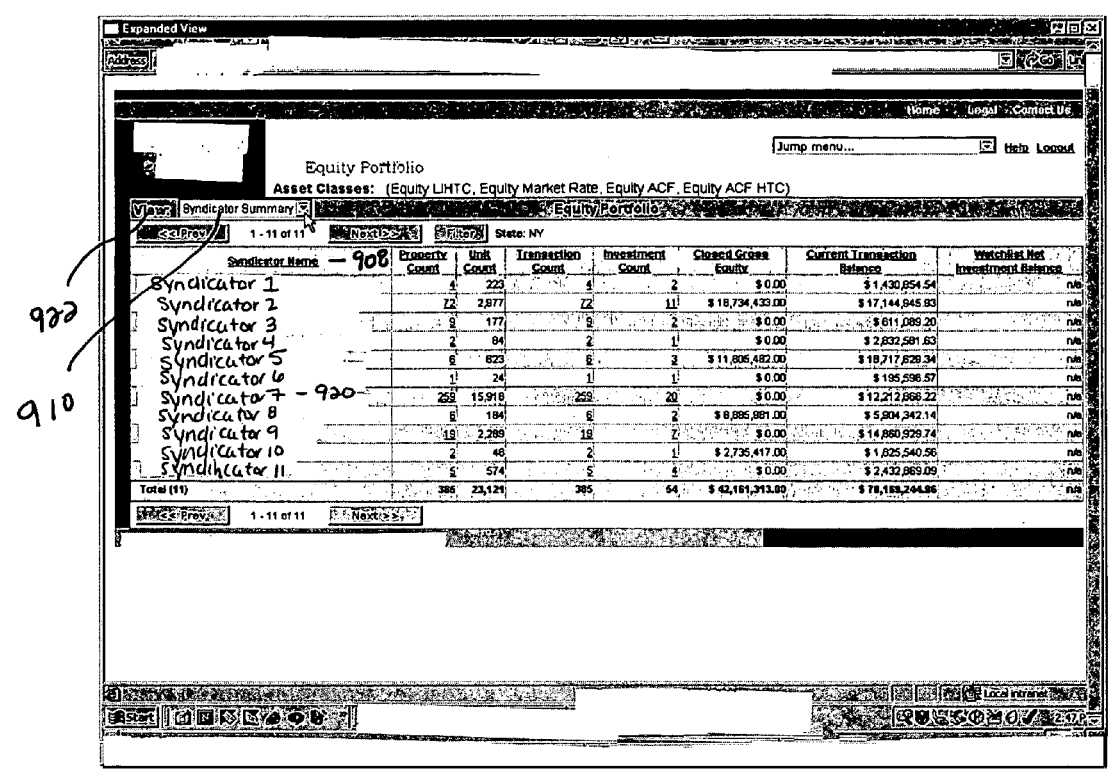
Figure 9C:
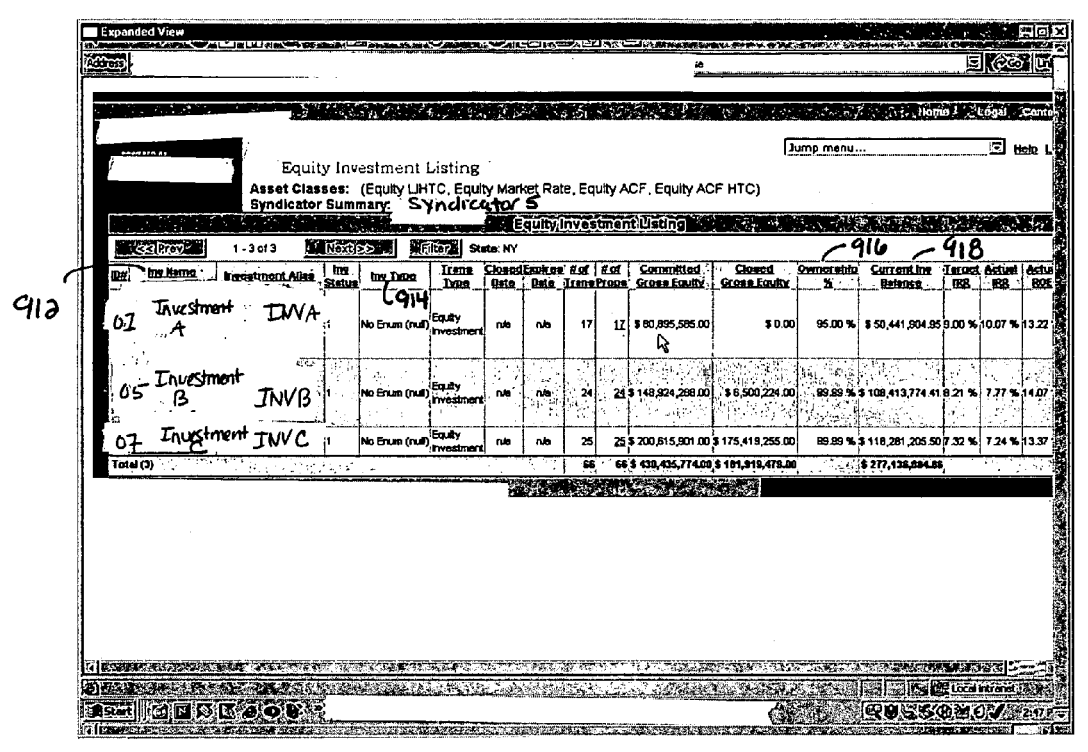
Figure 9D:
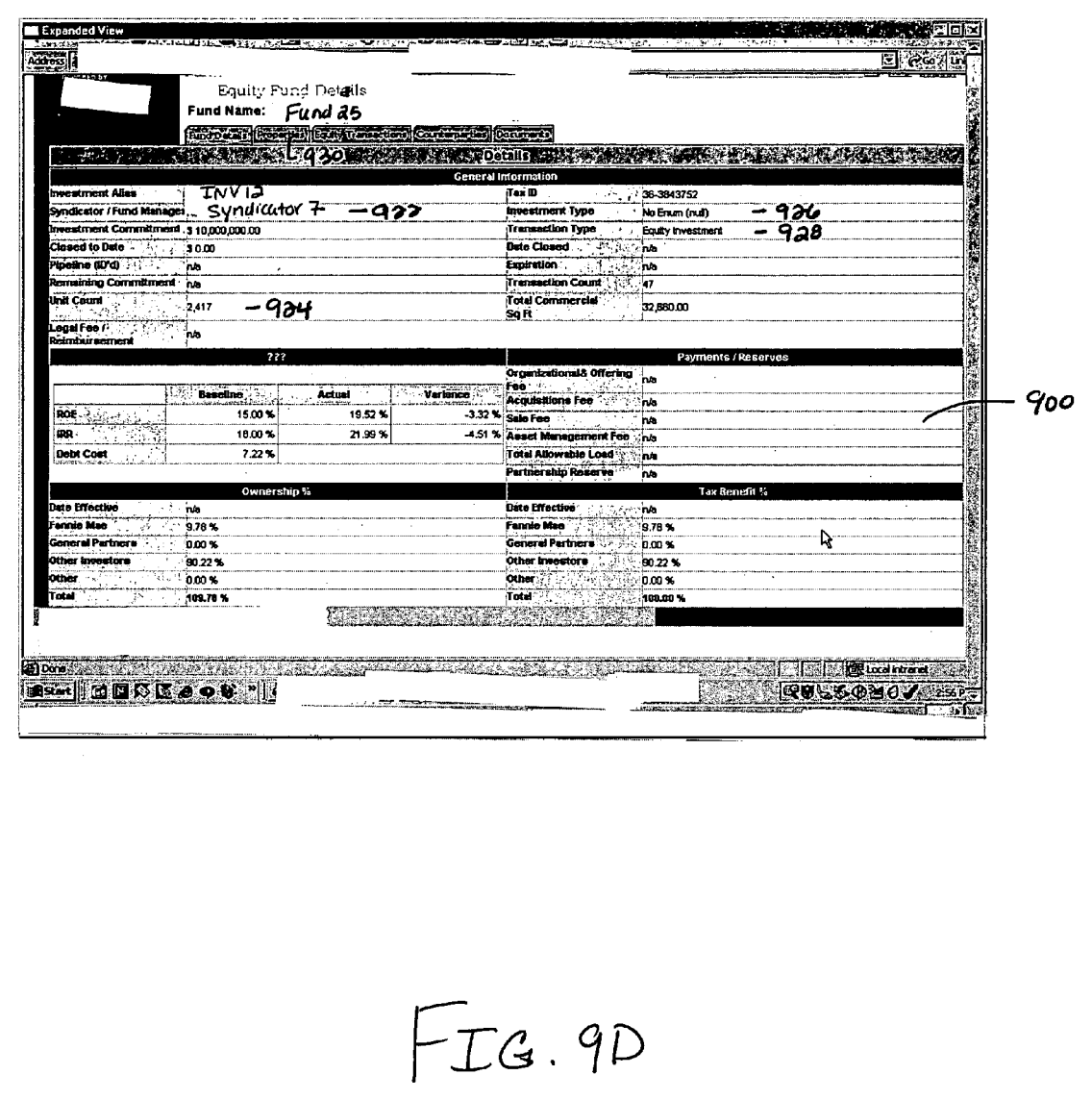
Figure 9E:
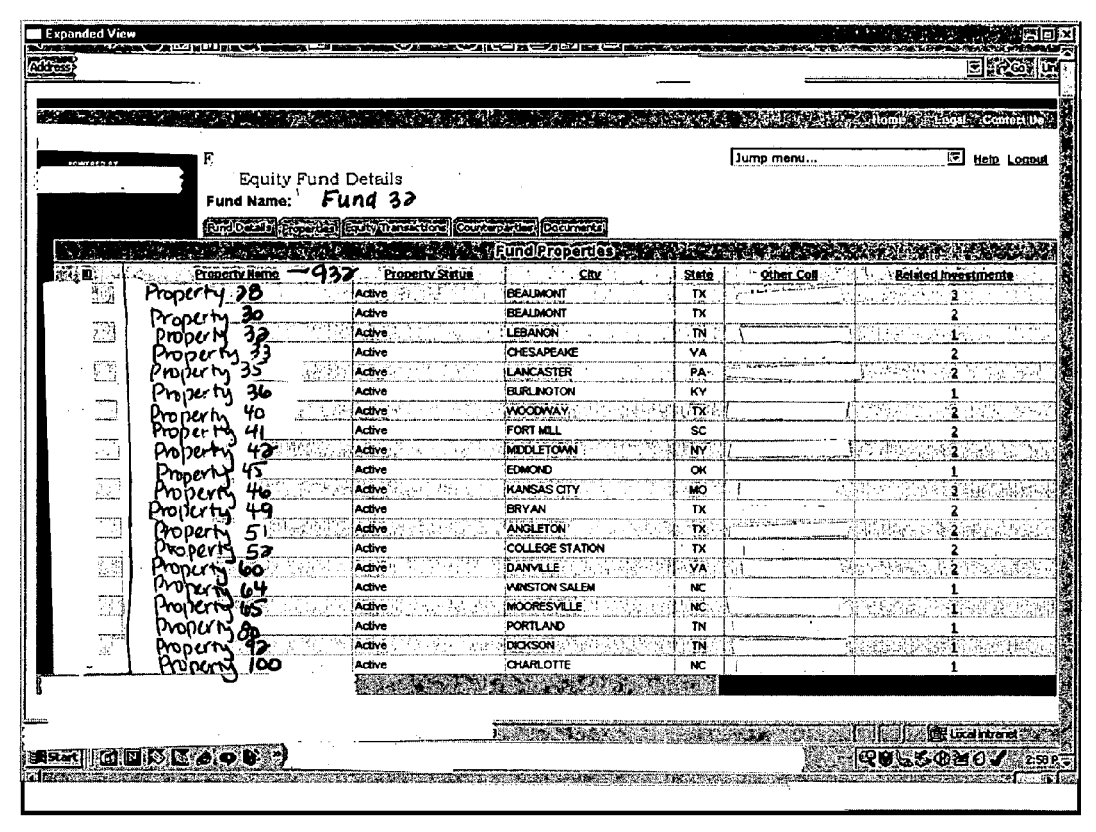

As mentioned, database 118 (shown in FIG. 1) is configured to store data regarding a plurality of financial assets. Accordingly, a user 102 (shown in FIG. 1) may select to view further details of, for example, data regarding an equity investment portfolio as shown in FIGS. 9A-9E or data regarding a bond investment portfolio as shown in FIGS. 10A-10D. FIGS. 9A-9E illustrate exemplary user interfaces used in accessing and viewing data related to equity investments. For example, by selecting an equity link 314 (shown in FIG. 3), 514 (shown in FIG. 5B) or a view by fund 902 using view menu 922, a user may view a listing and details of equity funds 904 for equity investments as shown in FIG. 9A. Additional information such as property count 906 for each equity fund may also be shown. Alternatively, a user may select to view the equity asset data by syndicator 908 using a syndicator summary option 910 from the view menu 922 as shown in FIG. 9B. In FIG. 9B, a link 920 (or links, e.g., a link for each syndicator) may be provided to view a listing of investments associated with a particular syndicator. An exemplary user interface including an investment listing for a particular syndicator is shown in FIG. 9C. Individual investments 912 are listed along with data for each investment such as investment type 914, ownership percentage 916, current investment balance 918, etc. Preferably, multiple links, menus or tabs are provided with each user interface to facilitate further filtering and selection of the financial asset data. For example, links, e.g., link 905 (shown in FIG. 9a) may be provided to view specific details of a particular equity fund as shown in FIG. 9D. In addition to specific fund details, such as syndicator 921, unit count 924, investment type 926, transaction type 928, etc., user interface 900 also includes a tab 930 or link that provides a view of data regarding the property or properties associated with the specific fund. When a user selects tab 930, a view such as shown in FIG. 9E may be displayed to show properties associated with the particular fund. In FIG. 9E, a listing of fund properties 932 for the specific fund is shown.

Figure 10A:
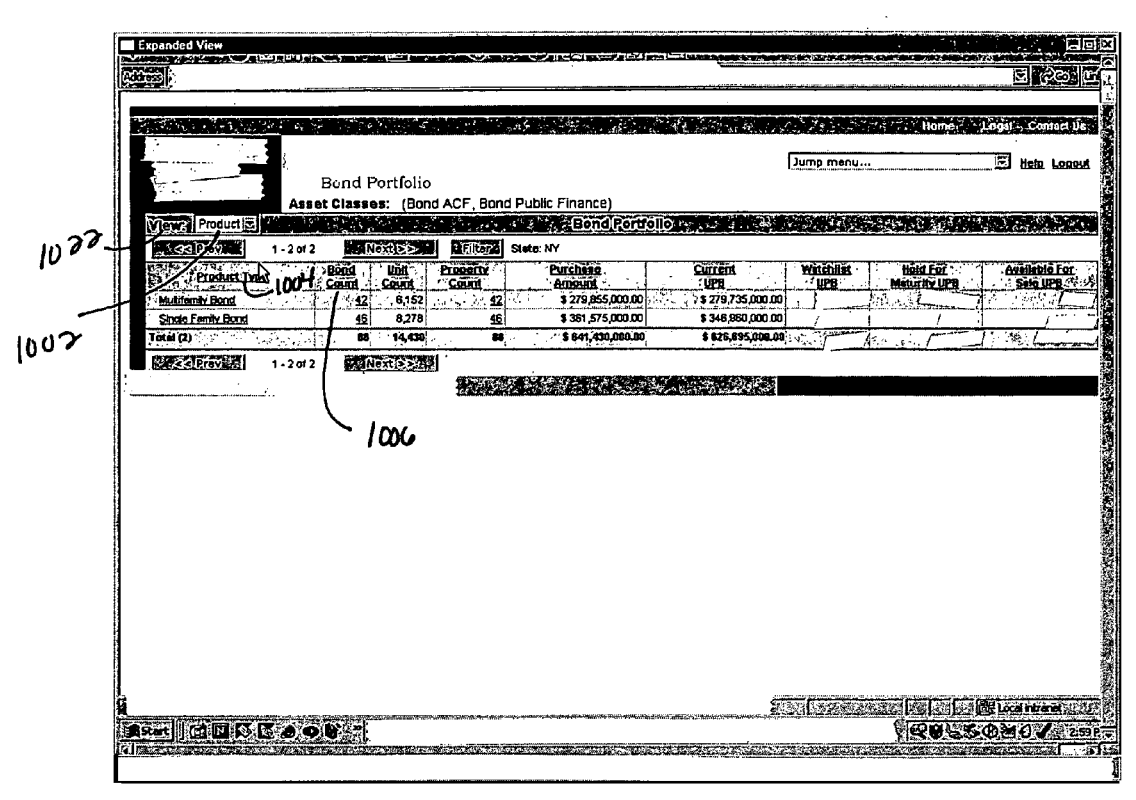
Figure 10D:
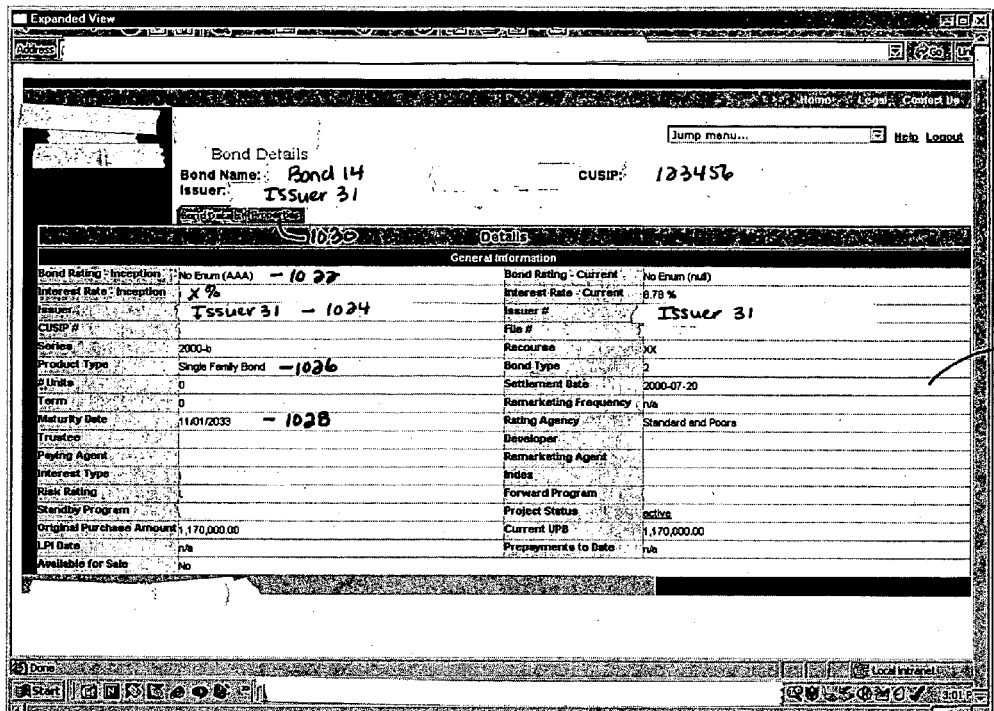

FIGS. 10A-10D illustrate exemplary user interfaces used in accessing and viewing data related to bond investments. For example, by selecting a bond link 316 (shown in FIG. 3) link and a view by product 1002 using view menu 1022, a user may view a listing and details of bond products 1004 for bond investments as shown in FIG. 10A. Additional information such as bond count 1006 for each bond product type may also be shown. Alternatively, a user may select to view the bond asset data by state 1008 as shown in FIG. 10B. In FIG. 10B, a link 1010 (or links, e.g., a link for each state) may be provided to view a listing of issuers associated with a particular state. An exemplary user interface including an issuer listing is shown in FIG. 10C. Individual issuers 1012 are listed along with data for each issuer such as series 1014, current unpaid balance 1016, current interest rate 1018, etc. Preferably, multiple links, menus or tabs are provided with each user interface to facilitate further filtering and selection of the financial asset data. For example, a link 1020 (shown in FIG. 10C) may be provided to view specific details of a particular bond as shown in FIG. 10D. In FIG. 10D, specific bond details, such as bond rating 1022, issuer 1024, product type 1026, maturity date 1028, etc. may be shown. User interface 1000, shown in FIG. 10D, also includes a tab 1030 or link that provides a view of data regarding the property or properties associated with the specific bond.

Returning to FIG. 1, deal management logic 110, trend and analysis logic 114 and cash flow management logic 116 may also utilize aspects of user interface 104, data management logic 112 and database 118 to perform further functions of data processing system 100. The deal management logic 110, data management logic 112 and the trend and analysis logic 114 may also cooperate to implement the logic described as investment rating engine 117 in "Property Investment Rating System and Method," 11/026,433, filed simultaneously herewith, and hereby incorporated by reference. In this configuration, the user interface logic 106 and the database 118 of the system described herein may implement the user interface logic 115 and the database 116, respectively, of the system described in the "Property Investment Rating System and Method" application. Likewise, the cash flow management logic 116 may be used to process data received from the counterparty data sources (e.g., borrower computer system) 120.

Figure 11:
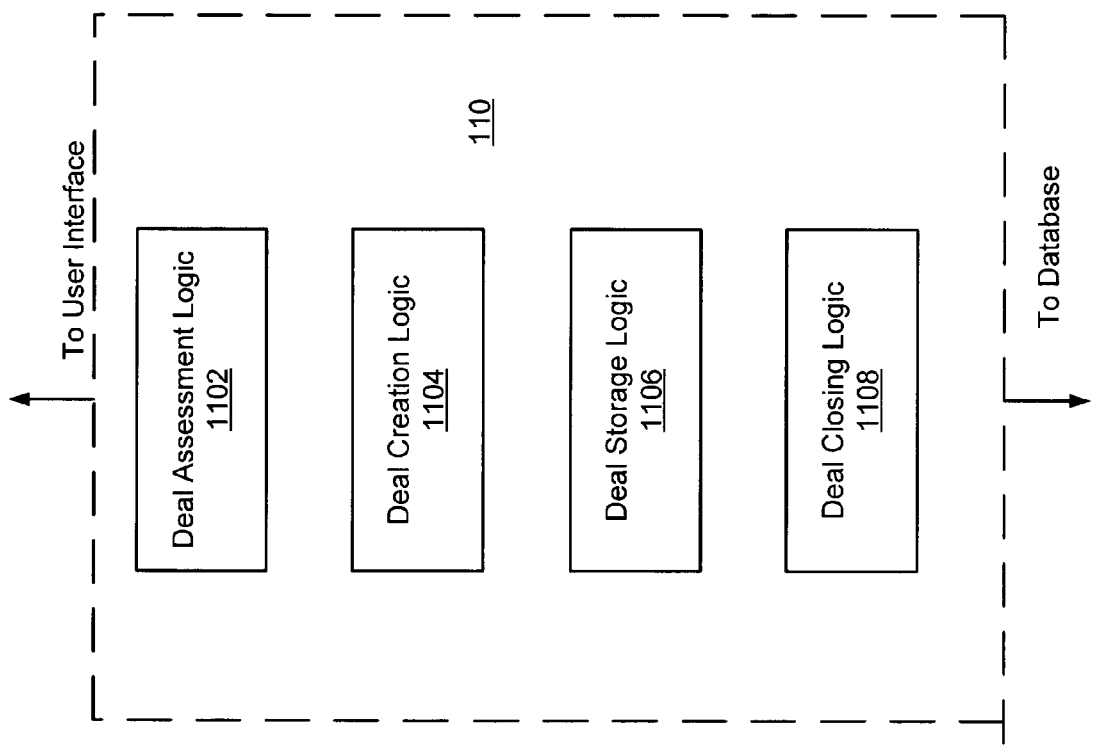
FIG. 11 is a block diagram showing the deal management logic of the system in FIG. 1 in accordance with an embodiment.

Deal management logic 110 provides tools to assist a user 102 in assessing, creating and closing deals regarding various investments in multifamily housing and housing developments. FIG. 11 is a block diagram showing the deal management logic 110 of the system in FIG. 1 in accordance with an embodiment. Deal management logic 110 includes deal assessment logic 1102, deal creation logic 1104, deal storage logic 1106 and deal closing logic 1108. A user 102 (shown in FIG. 1) may access the financial asset data from database 118 (shown in FIG. 1) utilizing deal assessment logic 1102 to determine, for example, whether the investor has had previous investments in a property for which a deal (e.g., the purchase of a mortgage loan for the property) is being proposed and to determine how such investments performed. Alternatively, a user may access the financial asset data to determine the past performance of a counterparty to the present deal. This information may be useful in determining particular characteristics of the present deal. Past performance of other areas (e.g., geographies, other similar transactions, other building types) may also be used to evaluate and predict the financial performance of a potential deal or transaction. Deal assessment logic 1102 may further utilize aspects of trend and analysis logic 116 (discussed below) to view market research and analysis, counterparty analysis, portfolio analysis, etc.

As discussed above, a user may enter data regarding the deal using user interface 104 (shown in FIG. 1) in conjunction with deal creation logic 1104. A user interface including a deal creation template may be provided to, for example, an authorized user of the investor to receive and prompt a user to enter data related to the deal such as asset type (e.g., debt, equity, bond), product type, counterparty, loan data, borrower data, pricing data, etc. Data entered by user 102 (shown in FIG. 1) is submitted to deal creation logic 1104. Data may also be received from other sources, such as other internal investor systems or external systems. Accordingly, deal management logic 110 and/or database 118 (shown in FIG. 1) may be coupled to other internal investor systems or external systems that provide financial asset data. Deal creation logic 1104 submits the received data to deal storage logic 1106 which may be used to forward the data to database 118 (shown in FIG. 1). Deal storage logic 1106 may also be configured to format data into preferred formats before storage in database 118 or to store data of a variety of formats including non-standard forms, e.g., memos, e-mails, documents, e-signatures, etc. In one embodiment, original paper documents associated with a deal may be scanned into electronic format (e.g., an image (PDF)) and stored in database 118 (shown in FIG. 1).

Once the deal data has been entered and stored, the deal data may be submitted to deal closing logic 1108 which is configured to allow an authorized user of the investor to review and approve a deal so the deal may be closed. In addition, deal closing logic 1108 may include tools to assist user 102 (shown in FIG. 1) with any additional steps required to close a deal such as committing, delivery, securitization, transaction set-up, post purchase review, disclosures, funding, etc.

Returning to FIG. 1, trend and analysis logic 114 has access to the data in database 118 and is configured to allow an authorized user to generate and display portfolio analysis, market trend analysis, capital and risk management, financial analysis and reporting, etc. Referring to FIG. 12, trend and analysis logic 114 includes risk management logic 1202, portfolio analysis logic 1204, and report logic 1206. The risk management logic 1202 and the portfolio analysis logic 1204 are configured to analyze data in database 118 (including across multiple asset classes), and the report logic is configured to process information provided by risk management logic 1202 and the portfolio analysis logic 1204 to produce reports for the user. In another embodiment, trend and analysis logic 114 may include a system for determining counterparty exposure such as disclosed in co-pending U.S. patent application Ser. No. 10/324,101, filed Dec. 20, 2002, herein incorporated by reference in its entirety.

Risk management logic 1202 is configured to analyze data from database 118 to identify and determine the investor's exposure from, for example, (1) risk associated with specific properties across multiple asset classes, (2) risk associated with classes of properties (e.g., all properties in a particular congressional district) across multiple asset classes, (3) risk associated with specific borrowers across properties and/or asset classes or (4) risk associated with counterparties (e.g., how many deals are in place with a particular servicer and its subsidiaries) across multiple asset classes.

The portfolio analysis logic 1204 provides the user with other tools to analyze the data stored in the database 118. The investments in the database 118 may be sorted and grouped according to any field responsive to user inputs. The portfolio analysis logic 1204 may be configured to facilitate profitability analysis for a group of investments falling into a particular investment category/subcategory (e.g., where all loans are based on a common mortgage product, have a common lender, have a common borrower, are in a common geographic market, or other have other common characteristics). The portfolio analysis logic 1204 may also be configured to evaluate investment performance in other ways (e.g., default rate, delinquency rate, actual vs. expected performance values, and so on) for a group of investments.

The portfolio analysis logic 1204 may also perform analyses useful for complying with risk based capital requirements. For example, the portfolio analysis logic 1204 may be configured to provide information about the number and value of loans within different categories so that the amount of capital that needs to be allocated for each category may be determined. The analysis logic may also perform other calculations, for example, to assess return on capital.

The portfolio analysis logic 1204 may also be configured to assess credit metrics for a particular investment or for a group of investments associated with a particular geographic market or with a particular counterparty. For example, the portfolio analysis logic 1204 may be configured to perform stress testing to assess sensitivity of a group of investments to a change in financial conditions (e.g., change in interest rates, change in unemployment levels, and so on). The portfolio analysis logic 1204 may also be used to assess the financial position of counterparties such as lenders and borrowers and determine how sensitive a particular lender/borrower is to a change in financial conditions. The portfolio analysis logic 1204 may also model various scenarios to assess areas where a group of investments is particularly sensitive to one or more financial conditions, for example, to identify a financial condition which, if changed, would have a dramatic impact on investment performance (e.g., delinquency rates, default rates, and so on). Again, the analyses may be performed across multiple asset classes.

The portfolio analysis logic 1204 may also be configured to assist with portfolio repositioning. For example, if it is determined that a particular product line is unprofitable or suffers poor performance, the portfolio analysis logic 1204 may provide information regarding the number of investments currently held within the product line, the amount of time until those investments are repaid, the rate at which new investments under that product line are being purchased relative to investments in other product lines, and so on. Again, the analyses may be performed across multiple asset classes.

Report logic 1206, in conjunction with user interface 104 (shown in FIG. 1), is configured to permit users to request reports generated from the data in database 118. The reports may be predefined "canned" reports, or may be ad hoc reports defined by the user by drilling down into the data and/or defining data filters using user interface 104 as described above. The reports may include, for example, (1) custom or predefined reports containing detailed information generated by trend and analysis logic 114 or other subsystems of data processing system 100 (shown in FIG. 1) regarding, for example, asset types, investment types, properties, geographic locations, etc., (2) ad hoc reports generated by sorting and filtering data stored in the centralized database 118, (3) reports providing portfolio analysis, market trend analysis, financial analysis, other trend analysis, predictive and early warning models, (4) reports showing counterparty performance and analyzing financial returns at the deal, line of business and portfolio level, (5) reports showing property performance and analyzing financial returns at the deal, line of business and portfolio level, (6) reports that provide benchmarking against other properties, loans, lenders, etc. in the same market, geography, etc., or (7) reports used to monitor lender, borrower, developer, geographic concentration and exposure (e.g., properties that are in a certain geographic region affected by, for example, a natural disaster or economic downturn). The type of report generation capability available via report logic 1206 may be made dependent on the type of user (e.g., the user registration).

Figure 13A:
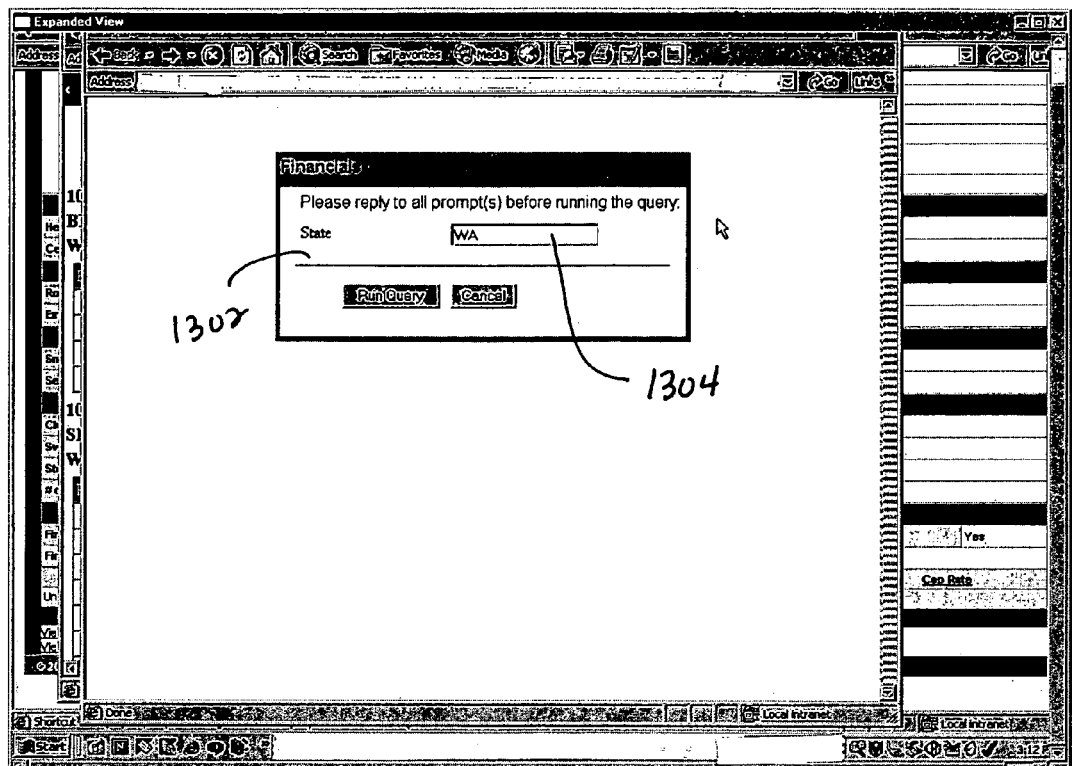
FIG. 13A is an exemplary user interface including a report generation query in accordance with an embodiment.
Figure 13C:
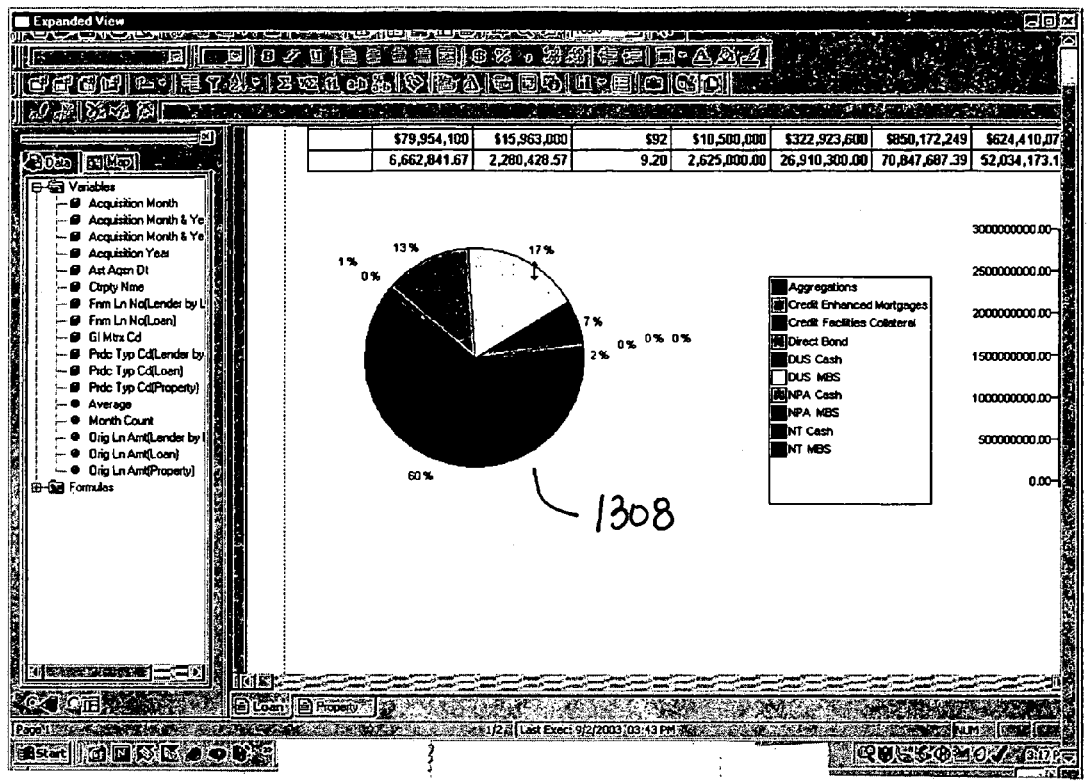
Figure 13D:
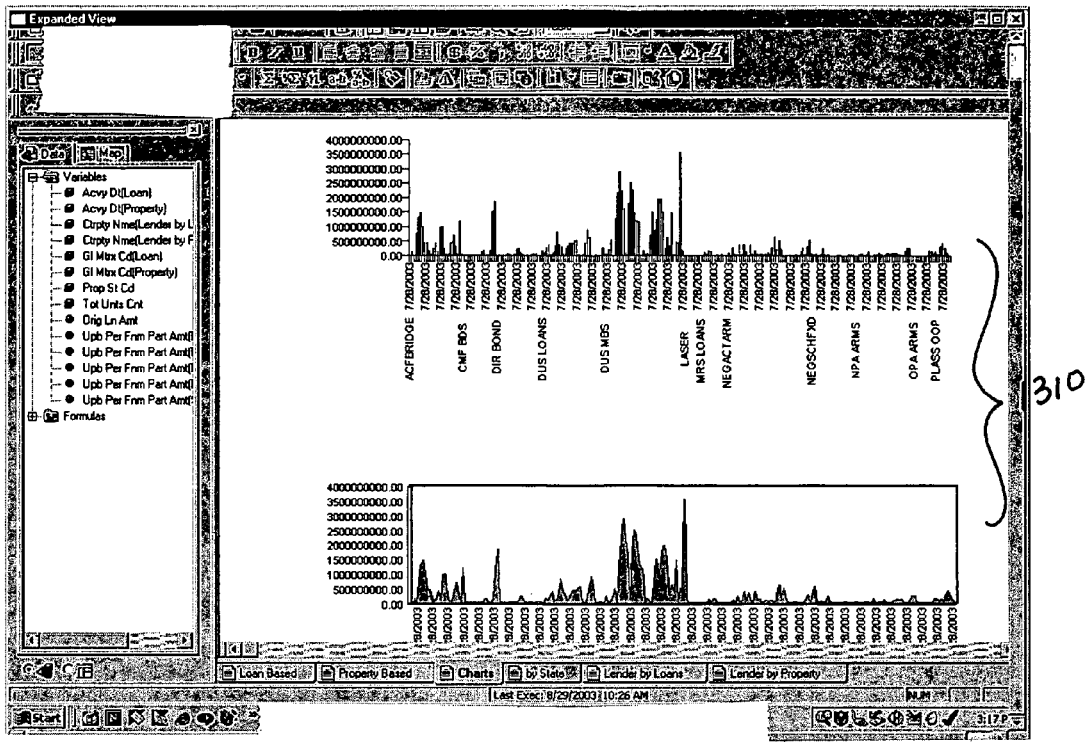
Figure 13E:
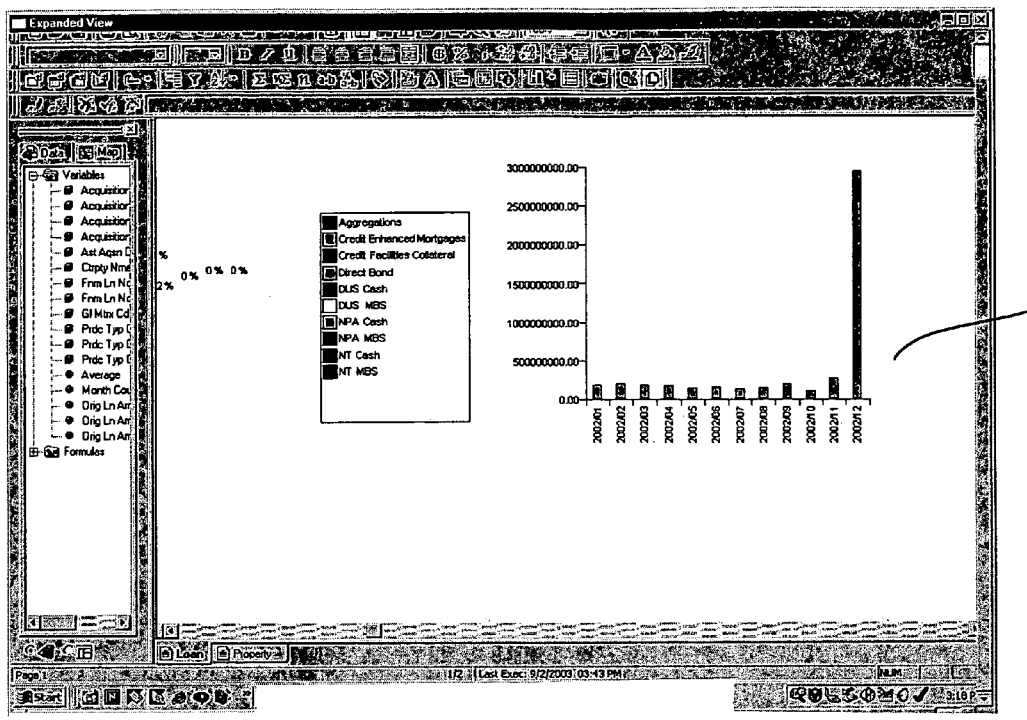
Figure 14A:
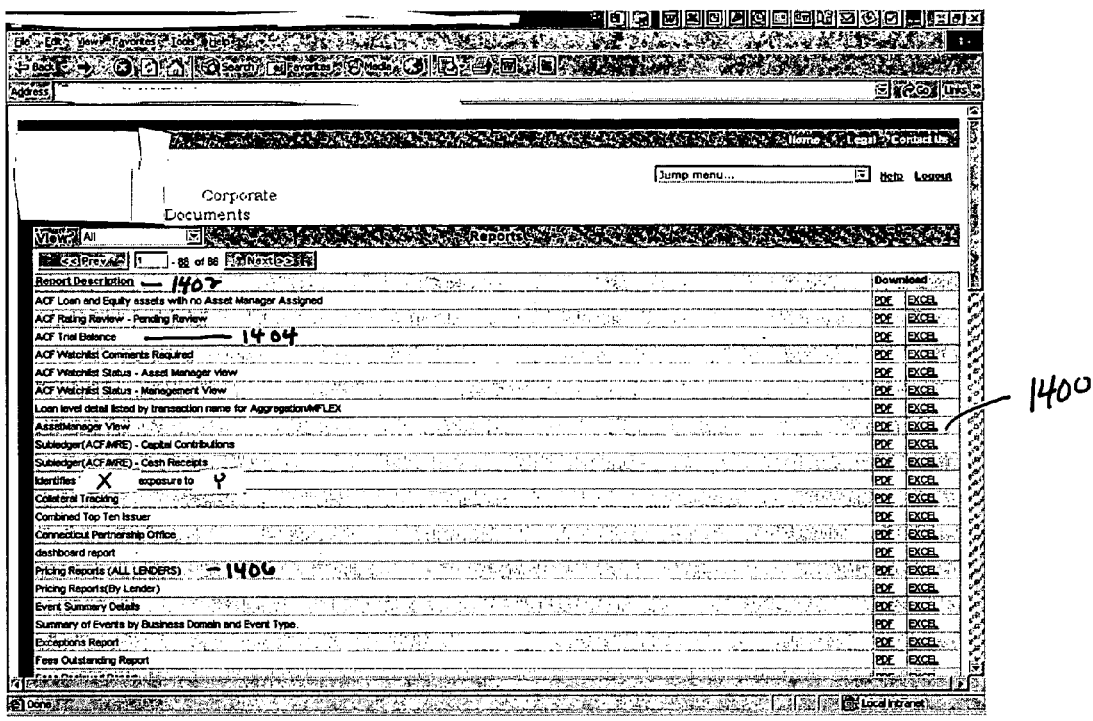
Figure 14B:
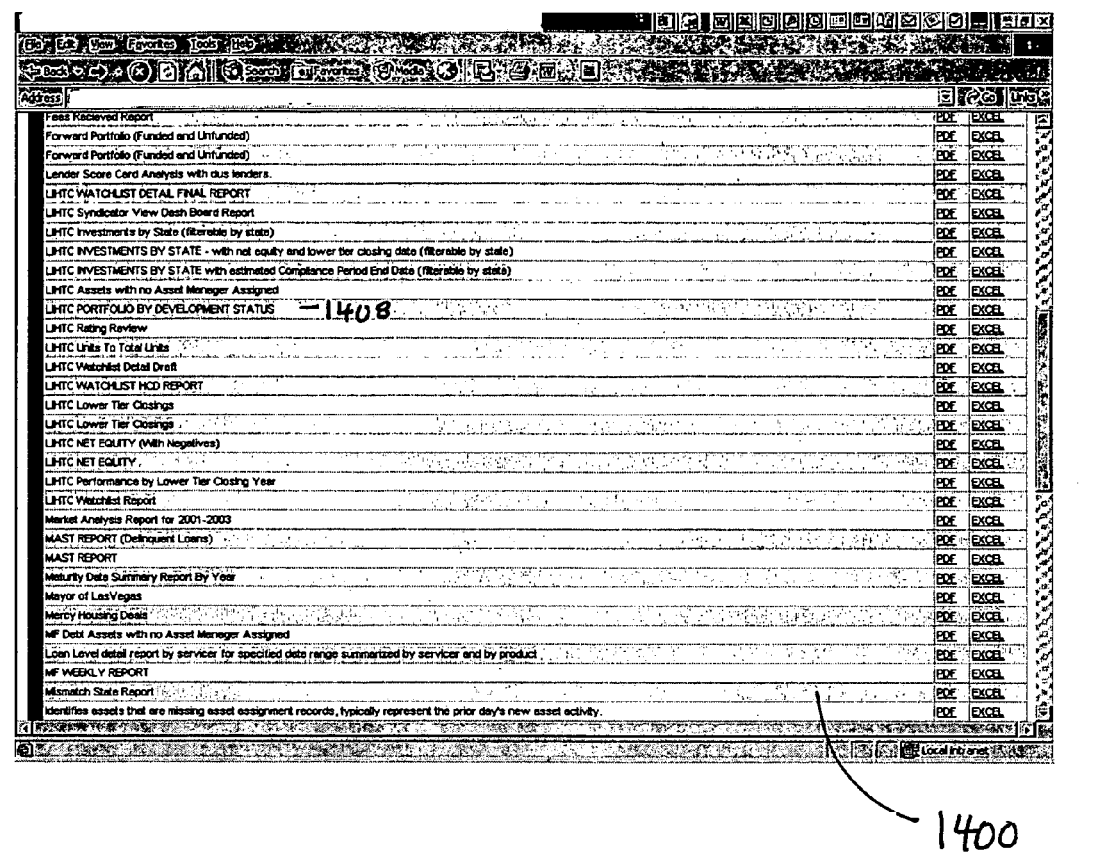
Figure 14C:
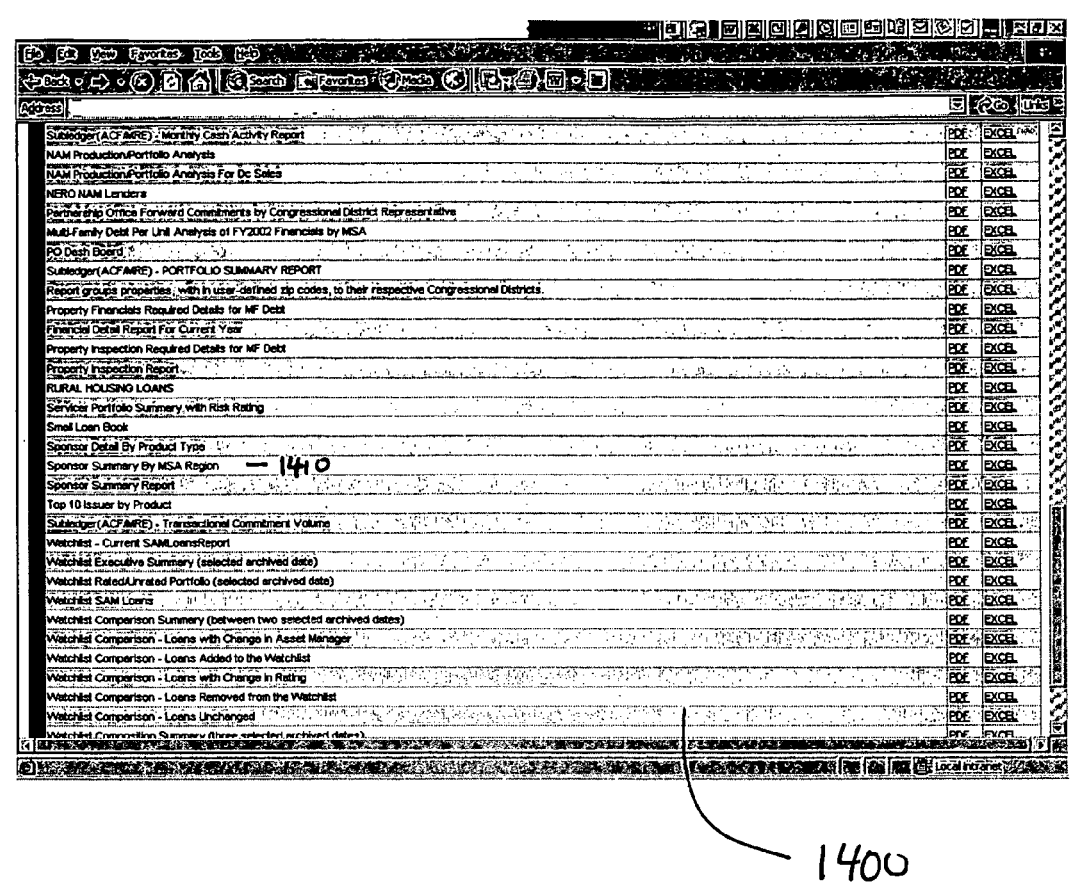

FIG. 13A shows an exemplary user interface including a report generation query 1302. A request for a financials report may be provided by an authorized user by providing a state 1304 for which the report is desired. Once a state is selected, a financial analytics report 1306 is generated by trend and analysis logic 114 (shown in FIGS. 1 and 12) and may be displayed as shown in FIG. 13B. FIG. 13C shows an alternative report generated by report logic 1206 in which a pie chart 1308 is displayed showing the percentage of the overall investment unpaid balance represented by multiple product types of the investor. FIG. 13D shows yet another exemplary report 1310 showing the percentage of overall unpaid balance represented by multiple product types of an investor. FIG. 13E shows yet another exemplary report 1312 showing the percentage of overall unpaid balance represented by multiple product types of an investor. In one embodiment, a user may view a listing of reports available. FIGS. 14 A-C illustrate an exemplary display of a listing of reports available to a user. In FIGS. 14A-C, a display 1400 is provided with a listing and description 1402 of reports. Various types of reports may be provided such as ACF Trial Balance 1404, Pricing Reports (ALL LENDERS) 1406, LITCH Portfolio by Development Status 1408 (shown in FIG. 14 B) and Sponsor Summary By MSA Region 1410 (shown in FIG. 14C). Each report may be viewed or downloaded in various formats.

Returning to FIG. 1, cash flow management logic 116 is configured to perform functions such as loan accounting, payment of investors, disclosure, delinquency processing, billing, monitoring payments received from borrowers, performing cash flow accounting across multiple asset classes, etc. In addition, cash flow management logic 116 may be configured to generate reports to meet regulatory disclosure requirements. As mentioned above, cash flow management logic 116 may utilize aspects of user interface 104 and database 118. An authorized user 102 may access the cash flow management logic 116 via user interface 104. FIG. 15 is a block diagram of the cash flow management logic of the system in FIG. 1 in more detail in accordance with an embodiment. Cash flow management logic 116 includes an accounting tool 1502, payment monitoring logic 1504 and cash processor 1506. Accounting tool 1502 provides a facility to allow the investor to create and maintain bank account information. The accounts may include accounts established with a counterparty (including vendors) to facilitate transactions. Historical records of counterparties account and draft information is maintained in database 118 to assist in resolving any issues that may arise. In addition, accounting tool 1502 manages accounting activities associated with the financial assets (e.g., debt, equity and bond). The accounting tool provides a consistent methodology for the recording of accounting events related to multifamily and housing development investments and activities across the deal management logic 110 (shown in FIG. 1), data management logic 112 (shown in FIG. 1) and cash flow management logic 116 into subsidiary ledgers for posting to a general ledger. Accounting tool 1502 supports the accounting activities related to the packaging of mortgage loan cash flows that have been securitized into, for example, a mortgage backed security. In addition, accounting tool 1502 supports accounting activities related to forming securities or packets out of portfolio loan collateral.

Accounting tool 1502 may further journalize mortgage related business activity, equity related business activity and bond related business activity, maintain subsidiary ledgers, provide audit trails, provide data integrity and control within subsidiary ledgers, facilitate timely reconciliations, provide flexibility to account for new products or changes depending on actual accounting methodologies, and provide information needed to perform financial analysis (e.g., in conjunction with trend and analysis logic 114 (shown in FIG. 1)). At the end of an accounting cycle, reconciliation may be performed between the subsidiary ledger activity and balances and the general ledger activity and balances using an automated reconciliation tool. An automated reconciliation tool may be provided that generates the results of the reconciliation and, through a user interface 104, displays the results to an authorized user (or operator). Any reconciling items between the subsidiary and general ledgers may be analyzed and resolved by the operator. Through the user interface 104, the user may update the status of the reconciling items to indicate the results of the analysis. As reconciling items are resolved, the operator triggers the automated reconciliation facility to repeat the reconciliation and display the results.

Payment monitoring logic 1504 receives remittance and disbursement information from an authorized user via user interface 104 and/or retrieves remittance and disbursement information from other areas of data processing system 100. The remittance and disbursement information includes, for example, effective date, loan number (if applicable), dollar amount, remittance code, and granular level details.

A cash processor 1506 creates cash transaction, for example, automated clearing house (ACH) transactions, outgoing check transactions, and so on. The cash processor 1506 begins this process after payment monitoring logic 1504 has completed the process of assessing and validating remittance and disbursement data. The first step in creating a cash transaction is validating servicer/vendor bank account information. Ultimately, an ACH transaction is created that debits or credits the appropriate custodial bank account.

The invention is described herein with reference to drawings. These drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

It should be noted that although flow charts may be provided herein showing a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and/or in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

It is important to note that the above-described embodiments are illustrative only. Although the invention has been described in conjunction with specific embodiments thereof, those skilled in the art will appreciate that numerous modifications are possible without materially departing from the novel teachings and advantages of the subject matter described herein. Accordingly, these and all other such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangements of the preferred and other exemplary embodiments without departing from the spirit of the present invention.

What is claimed is:

1. A computer-implemented data processing system for managing information related to a plurality of financial assets associated with housing and mortgage investments of an investor, the data processing system comprising:

a processing unit;

machine-readable storage media storing machine-executable instructions for execution by the processing unit comprising:

user interface logic to receive data regarding the plurality of financial assets including data regarding a plurality of properties associated with the plurality of financial assets and to provide access to the data regarding the plurality of financial assets, the plurality of financial assets including debt assets comprising an investment based on a loan associated with at least one of the plurality of properties, equity assets comprising equity associated with the at least one of the plurality of properties purchased as an investment, and bond assets comprising a revenue bond associated with the at least one of the plurality of properties purchased as an investment, wherein the user interface logic provides a debt asset user interface to access and view details regarding the debt assets, an equity asset user interface to access and view details regarding the equity assets, and a bond asset user interface to access and view details regarding the bond assets;

trend and analysis logic coupled to the user interface logic to process data regarding the plurality of financial assets and provide risk management results, wherein the risk management results include risks associated with a particular property across the plurality of financial assets;

a database coupled to the trend and analysis logic and the user interface logic to store the data regarding the plurality of financial assets and risk management results;

wherein the database links data for the particular property of the plurality of properties across the plurality of financial assets; and portfolio analysis logic coupled to the user interface logic to facilitate profitability analysis for a group of at least one of the debt assets, the equity assets, and the bond assets, perform analyses utilized in complying with risk based capital requirements, assessing credit metrics for at least one of the debt assets, the equity assets, and the bond assets, assess at least one of a counterparties' financial position and areas where the group of the at least one of the debt assets, the equity assets, and the bond assets is sensitive to at least one financial condition, and assist in portfolio repositioning, wherein the portfolio comprises the at least one of the debt assets, the equity assets, and the bond assets.

2. A computer-implemented data processing system according to claim 1, wherein the risk management results include risks associated with a particular type of property.

3. A computer-implemented data processing system according to claim 1, wherein the risk management results include risks associated with a specific borrower across the plurality of financial assets, the plurality of financial assets including debt assets comprising an investment based on a loan associated with at least one property of the plurality of properties, equity assets comprising equity associated with the at least one property of the plurality of properties purchased as an investment, and bond assets comprising a revenue bond associated with the at least one property of the plurality of properties purchased as an investment.

4. A computer-implemented data processing system according to claim 1, wherein the risk management results include risks associated with a particular counterparty across the plurality of financial assets, the plurality of financial assets including debt assets comprising an investment based on a loan associated with at least one property of the plurality of properties, equity assets comprising equity associated with the at least one property of the plurality of properties purchased as an investment, and bond assets comprising a revenue bond associated with the at least one property of the plurality of properties purchased as an investment.

5. A computer-implemented data processing system according to claim 1, wherein the trend and analysis logic is further configured to generates a report based on the risk management results.

6. A computer-implemented data processing system for managing information related to a plurality of financial assets associated with housing and mortgage investments of an investor, the data processing system comprising:

a processing unit;

machine-readable storage media storing machine-executable instructions for execution by the processing unit, comprising:

user interface logic to receive data regarding the plurality of financial assets including data regarding a plurality of properties associated with the plurality of financial assets and to provide access to the data regarding the plurality of financial assets, the plurality of financial assets including debt assets comprising an investment based on a loan associated with at least one of the plurality of properties, equity assets comprising equity associated with the at least one of the plurality of properties purchased as an investment, and bond assets comprising a revenue bond associated with the at least one of the plurality of properties purchased as an investment, wherein the user interface logic provides a debt asset user interface to access and view details regarding the debt assets, an equity asset user interface to access and view details regarding the equity assets, and a bond asset user interface to access and view details regarding the bond assets;

cash flow management logic coupled to the user interface logic to perform cash flow accounting across the plurality of financial assets;

a database coupled to the cash flow management logic and the user interface logic to store the data regarding the plurality of financial assets;

wherein the database links data for a particular property of the plurality of properties across the plurality of financial assets; and portfolio analysis logic coupled to the user interface logic to facilitate profitability analysis for a group of at least one of the debt assets, the equity assets, and the bond assets, perform analyses utilized in complying with risk based capital requirements, assessing credit metrics for at least one of the debt assets, the equity assets, and the bond assets, assess at least one of a counterparties' financial position and areas where the group of the at least one of the debt assets, the equity assets, and the bond assets is sensitive to at least one financial condition, and assist in portfolio repositioning, wherein the portfolio comprises the at least one of the debt assets, the equity assets, and the bond assets.

7. A computer-implemented data processing system for managing information related to a plurality of financial assets associated with housing and mortgage investments of an investor, the system comprising:

a processing unit;

machine-readable storage media storing machine-executable instructions for execution by the processing unit comprising:

user interface logic to receive data regarding the plurality of financial assets including data regarding a plurality of properties associated with the plurality of financial assets and to provide access to the data regarding the plurality of financial assets, the plurality of financial assets including debt assets comprising an investment based on a loan associated with at least one of the plurality of properties, equity assets comprising equity associated with the at least one of the plurality of properties purchased as an investment, and bond assets comprising a revenue bond associated with the at least one of the plurality of properties purchased as an investment, wherein the user interface logic provides a debt asset user interface to access and view details regarding the debt assets, an equity asset user interface to access and view details regarding the equity assets, and a bond asset user interface to access and view details regarding the bond assets;

access and security logic coupled to the user interface logic to provide a registered user with access to a database management logic;

data management logic coupled to the user interface logic and the access and security logic to retrieve and process the data regarding the plurality of financial assets;

a database coupled to the data management logic, the user interface logic and the access and security logic to store the data regarding the plurality of financial assets and to link data for a particular property of the plurality of properties across the plurality of financial assets, the database further storing the received data;

deal management logic coupled to the user interface logic and the access and security logic to assist the registered user in assessing, creating and closing an investment transaction, the deal management logic including, deal assessment logic to generate an assessment analysis based on at least one report from a trend and analysis logic, deal creation logic to submit received deal creation data to deal storage logic, the deal storage logic to transmit the received deal creation data to the database and to modify the received deal creation data into a preferred format prior to transmitting the received deal creation data to the database, the deal storage logic further transmitting a stored received deal creation data to a deal closing logic, and deal closing logic to allow at least one registered user to complete the investment transaction;

trend and analysis logic coupled to the user interface logic and the access and security logic to generate the at least one report utilizing report logic and wherein the trend and analysis logic includes a risk management logic providing risk management results, wherein the risk management results include risks associated with the particular property across the plurality of financial assets;

portfolio analysis logic coupled to the user interface logic to facilitate profitability analysis for a group of at least one of the debt assets, the equity assets, and the bond assets, perform analyses utilized in complying with risk based capital requirements, assessing credit metrics for at least one of the debt assets, the equity assets, and the bond assets, assess at least one of a counterparties' financial position and areas where the group of the at least one of the debt assets, the equity assets, and the bond assets is sensitive to at least one financial condition, and assist in portfolio repositioning, wherein the portfolio comprises the at least one of the debt assets, the equity assets, and the bond assets; and cash flow management logic coupled to the user interface logic and the access and security logic to perform a loan accounting, a payment of investors, a disclosure, a delinquency processing, a billing, a monitoring of payments received from borrowers and a cash flow accounting across multiple asset classes for the registered user, wherein, for the particular property, the plurality of financial assets include a debt asset comprising an investment based on a loan associated with the particular property, an equity asset comprising equity associated with the particular property purchased as an investment, and a bond asset comprising a revenue bond associated with the particular property purchased as an investment;

wherein the data regarding the plurality of financial assets includes data regarding a debt deal associated with the debt asset, an equity deal associated with the equity asset, and a bond deal associated with the bond asset; and wherein the debt deal, the equity deal, and the bond deal occur at different times with different counterparties.

8. A computer-implemented data processing system according to claim 7, wherein the debt assets include a mortgage backed security backed by a plurality of mortgage loans.

9. A computer-implemented data processing system according to claim 8, wherein each registered user has a registration with the data processing system and the registration includes an access level identifying the data the user may access.

10. A computer-implemented data processing system according to claim 7, wherein the user interface logic is configured to provides access to a plurality of registered users.

11. A computer-implemented data processing system according to claim 7, wherein the data regarding the plurality of financial assets includes data regarding deals associated with the plurality of financial assets.

12. A computer-implemented data processing system according to claim 7, wherein the data regarding the plurality of financial assets includes data regarding a plurality of counterparties associated with the plurality of financial assets.

13. A computer-implemented data processing system according to claim 12, wherein the plurality of counterparties includes lenders, brokers, servicers, borrowers and syndicators.

14. A computer-implemented data processing system according to claim 7, wherein the plurality of properties includes multifamily properties.

15. A computer-implemented data processing system according to claim 7, wherein the data regarding the plurality of financial assets includes data regarding a plurality of mortgage loans associated with the plurality of financial assets.

16. A computer-implemented data processing system according to claim 7, wherein the deal management logic receives and processes data regarding the investment transaction between the investor and a counterparty regarding at least one of the plurality of financial assets.

17. A computer-implemented data processing system according to claim 7, wherein the cash flow management logic generates at least one regulatory disclosure report.

18. A computer-implemented data processing system according to claim 7, wherein the user interface logic include a network-enabled user interface permitting the registered user to access the data processing system by way of an Intranet.

19. A computer-implemented data processing system according to claim 1,
   wherein, for the particular property, the plurality of financial assets include a debt asset, an equity asset, and a bond asset;
   wherein the data regarding the plurality of financial assets includes data regarding a debt deal associated with the debt asset, an equity deal associated with the equity asset, and a bond deal associated with the bond asset; and
   wherein the debt deal, the equity deal, and the bond deal occur at different times with different counterparties.

20. A computer-implemented data processing system according to claim 19, further comprising deal management logic coupled to the user interface logic to receive and process data regarding a deal between the investor and a counterparty regarding at least one of the plurality of financial assets including evaluating exposure of the investor based the data regarding the plurality of financial assets; and wherein evaluating exposure of the investor includes evaluating past performance of the particular property over the life of the particular property based on the data regarding the debt deal associated with the debt asset, the equity deal associated with the equity asset, and the bond deal associated with the bond asset.

21. A computer-implemented data processing system according to claim 20, wherein evaluating exposure of the investor includes evaluating past performance of a counterparty.

22. A computer-implemented data processing system according to claim 20, wherein evaluating exposure of the investor includes evaluating past performance of financial assets in a particular geographic region.

23. A computer-implemented data processing system according to claim 7, wherein the deal management logic evaluates exposure of the investor based upon the data regarding the plurality of financial assets; and wherein evaluating exposure of the investor includes evaluating past performance of the particular property over the life of the particular property based on the data regarding the debt deal associated with the debt asset, the equity deal associated with the equity asset, and the bond deal associated with the bond asset.

24. A computer-implemented data processing system according to claim 23, wherein evaluating exposure of the investor includes evaluating past performance of a counterparty.

25. A computer-implemented data processing system according to claim 23, wherein evaluating exposure of the investor includes evaluating past performance of financial assets in a particular geographic region.

* * * * *